(12) United States Patent
Ji et al.

(10) Patent No.: US 8,061,888 B2
(45) Date of Patent: Nov. 22, 2011

(54) AUTOCLAVE WITH UNDERFLOW DIVIDERS

(75) Inventors: Jinxing Ji, Burnaby (CA); James A. King, West Vancouver (CA)

(73) Assignee: Barrick Gold Corporation, Toronto (CA)

( * ) Notice: Subject to any disclaimer, the term of this patent is extended or adjusted under 35 U.S.C. 154(b) by 1179 days.

(21) Appl. No.: 11/686,165

(22) Filed: Mar. 14, 2007

(65) Prior Publication Data
US 2007/0217285 A1    Sep. 20, 2007

Related U.S. Application Data

(60) Provisional application No. 60/783,295, filed on Mar. 17, 2006.

(51) Int. Cl.
*B01F 7/20*     (2006.01)
*B01F 13/06*    (2006.01)
*B01J 3/04*     (2006.01)

(52) U.S. Cl. ............. 366/155.1; 75/744; 423/41
(58) Field of Classification Search ........ 75/711, 75/744; 366/291, 155.1, 155.2; 423/41; 422/226, 228
See application file for complete search history.

(56) References Cited

U.S. PATENT DOCUMENTS

| 52,325 A * | 1/1866 | Scherpf ............... 423/41 |
| 748,662 A * | 1/1904 | Sebillot ............... 423/41 |
| 1,308,639 A | 7/1919 | Newdick |
| 1,413,724 A * | 4/1922 | Groch ............... 261/87 |
| 1,461,807 A | 7/1923 | Silver |
| 1,745,291 A * | 1/1930 | Bleil ............... 366/290 |
| 1,890,934 A * | 12/1932 | Carson ............... 205/583 |
| 2,147,009 A | 2/1939 | Chapman |
| 2,234,140 A | 3/1941 | Falconer et al. |
| 2,315,187 A | 3/1943 | Chapman |
| 2,470,707 A | 4/1948 | Herrmann |
| 2,476,420 A | 7/1949 | Krebs |
| 2,478,652 A | 8/1949 | Byler et al. |
| 2,479,930 A | 8/1949 | Herkenhoff |
| 2,502,490 A | 4/1950 | Sweet |
| 2,519,770 A | 8/1950 | Kramer |
| 2,545,239 A | 3/1951 | McQuiston, Jr. et al. |
| 2,579,531 A | 12/1951 | Zadra |
| 2,588,450 A | 3/1952 | Zadra |
| 2,612,470 A | 9/1952 | Griess, Jr. et al. |
| 2,646,346 A * | 7/1953 | Coplan et al. ............... 422/259 |
| 2,646,347 A | 7/1953 | Jacks et al. |
| 2,658,827 A | 11/1953 | Rizo-Patron |

(Continued)

FOREIGN PATENT DOCUMENTS

AU    2004285993    5/2005

(Continued)

OTHER PUBLICATIONS

"Final Results From Farallon's Metallurgical Test Program Confirm Precious Metals Recoveries for Campo Morado", available at farallonresources.com/i/pdf/FAN_2005-12-15_NR.pdf, Dec. 15, 2005, 7 pages.

(Continued)

*Primary Examiner* — David Sorkin
*Assistant Examiner* — Andrew Janca
(74) *Attorney, Agent, or Firm* — Sheridan Ross P.C.

(57) ABSTRACT

The present invention is directed to a multi-compartment autoclave using inter-compartment dividers having one or more underflow openings for passing a feed stream between compartments.

26 Claims, 12 Drawing Sheets

U.S. PATENT DOCUMENTS

| | | | |
|---|---|---|---|
| 2,726,934 A | 12/1955 | Forward et al. | |
| 2,767,965 A * | 10/1956 | Daman | 261/87 |
| 2,777,764 A | 1/1957 | Hedley et al. | |
| 2,804,379 A | 8/1957 | Wistrich et al. | |
| 2,827,372 A | 3/1958 | Britton | |
| 2,836,490 A | 5/1958 | Mackiw et al. | |
| 2,845,936 A * | 8/1958 | Boynton et al. | 134/60 |
| 2,867,529 A | 1/1959 | Forward et al. | |
| 2,871,116 A * | 1/1959 | Clark | 423/141 |
| 2,893,846 A | 7/1959 | Wistrich et al. | |
| 2,919,802 A | 1/1960 | Drake | |
| 2,928,661 A | 3/1960 | MacLaren | |
| 2,937,078 A * | 5/1960 | Parish et al. | 422/257 |
| 2,954,290 A | 9/1960 | Teichmann et al. | |
| 2,989,380 A | 6/1961 | Weiss et al. | |
| 3,010,803 A | 11/1961 | Wistrich et al. | |
| 3,010,804 A | 11/1961 | Wistrich et al. | |
| 3,013,866 A | 12/1961 | Samaniego et al. | |
| 3,018,170 A | 1/1962 | Soloducha | |
| 3,054,230 A * | 9/1962 | Logue | 451/326 |
| 3,088,820 A | 5/1963 | Mackiw et al. | |
| 3,130,015 A | 4/1964 | Monroe | |
| 3,174,848 A | 3/1965 | Bruce | |
| 3,206,288 A * | 9/1965 | Hazen et al. | 423/63 |
| 3,215,611 A | 11/1965 | Pawick et al. | |
| 3,264,099 A | 8/1966 | Johnson | |
| 3,264,699 A | 8/1966 | Knowlton | |
| 3,266,872 A | 8/1966 | Terao et al. | |
| 3,285,705 A | 11/1966 | Zuiderweg et al. | |
| 3,293,027 A | 12/1966 | Mackiw et al. | |
| 3,322,505 A | 5/1967 | Weber | |
| 3,357,823 A | 12/1967 | Tuwiner | |
| 3,414,245 A | 12/1968 | Frazer | |
| 3,440,256 A | 4/1969 | Rich | |
| 3,463,710 A | 8/1969 | Lower | |
| 3,477,928 A | 11/1969 | Coltrinari | |
| 3,522,018 A | 7/1970 | Bachmann et al. | |
| 3,523,762 A | 8/1970 | Broughton | |
| 3,529,026 A | 9/1970 | Blumcke et al. | |
| 3,537,824 A | 11/1970 | Schmidt | |
| 3,547,589 A | 12/1970 | Rice et al. | |
| 3,547,813 A * | 12/1970 | Robinson et al. | 210/604 |
| 3,547,814 A * | 12/1970 | McWhirter | 210/604 |
| 3,549,351 A | 12/1970 | Lundquist | |
| 3,574,600 A | 4/1971 | Scholmer et al. | |
| 3,599,601 A | 8/1971 | Ishikawa | |
| 3,615,260 A | 10/1971 | Hanson | |
| 3,639,925 A | 2/1972 | Scheiner et al. | |
| 3,660,277 A * | 5/1972 | McWhirter et al. | 210/604 |
| 3,670,887 A * | 6/1972 | McWhirter | 210/604 |
| 3,672,873 A | 6/1972 | Huggins et al. | |
| 3,687,635 A | 8/1972 | Wijard et al. | |
| 3,692,763 A * | 9/1972 | Van Saane et al. | 526/88 |
| 3,743,501 A | 7/1973 | Cusanelli et al. | |
| 3,761,566 A | 9/1973 | Michal | |
| 3,772,188 A * | 11/1973 | Edwards | 210/629 |
| 3,809,549 A | 5/1974 | Opratko et al. | |
| 3,840,365 A * | 10/1974 | Hammes et al. | 75/399 |
| 3,846,124 A | 11/1974 | Guay | |
| 3,867,268 A | 2/1975 | Kawulka et al. | |
| 3,879,270 A | 4/1975 | Kowalski | |
| 3,909,248 A | 9/1975 | Ryan et al. | |
| 3,914,162 A | 10/1975 | Kowalski | |
| 3,935,006 A | 1/1976 | Fischer | |
| 3,954,450 A | 5/1976 | Kuhn et al. | |
| 3,954,606 A * | 5/1976 | Block et al. | 210/627 |
| 3,960,717 A * | 6/1976 | Wyatt | 210/604 |
| 3,961,908 A | 6/1976 | Touro | |
| 3,962,402 A | 6/1976 | Touro | |
| 3,997,445 A * | 12/1976 | Hannestad | 210/319 |
| 4,004,991 A | 1/1977 | Veltman et al. | |
| 4,007,120 A * | 2/1977 | Bowen | 210/120 |
| 4,022,866 A | 5/1977 | Kuhn et al. | |
| 4,029,736 A | 6/1977 | Melkonian | |
| 4,038,362 A | 7/1977 | Guay | |
| 4,044,096 A | 8/1977 | Queneau et al. | |
| 4,052,151 A | 10/1977 | Reichrt et al. | |
| 4,053,305 A | 10/1977 | Smyres et al. | |
| 4,056,261 A | 11/1977 | Darrah | |
| 4,070,182 A | 1/1978 | Genik-Sas-Berezowsky et al. | |
| 4,080,287 A * | 3/1978 | Conway et al. | 210/604 |
| 4,085,266 A | 4/1978 | Nakai et al. | |
| 4,094,668 A | 6/1978 | Yannopoulos et al. | |
| 4,097,271 A | 6/1978 | Swinkels et al. | |
| 4,123,600 A | 10/1978 | Kita et al. | |
| 4,124,462 A | 11/1978 | Reinhardt et al. | |
| 4,126,757 A | 11/1978 | Smith, Jr. et al. | |
| 4,135,918 A | 1/1979 | Ettel et al. | |
| 4,149,880 A | 4/1979 | Prater et al. | |
| 4,153,522 A | 5/1979 | Arbiter et al. | |
| 4,167,470 A | 9/1979 | Karnofsky | |
| 4,188,208 A | 2/1980 | Guay | |
| 4,219,354 A | 8/1980 | Rastas et al. | |
| 4,249,032 A | 2/1981 | Smith, Jr. et al. | |
| 4,252,924 A | 2/1981 | Chatterjee | |
| 4,259,107 A | 3/1981 | Guay | |
| 4,265,739 A | 5/1981 | Dalton | |
| 4,266,972 A | 5/1981 | Redondo-Abad et al. | |
| 4,267,069 A | 5/1981 | Davidson et al. | |
| 4,269,622 A | 5/1981 | Kerley, Jr. | |
| 4,279,867 A | 7/1981 | Weir | |
| 4,279,868 A | 7/1981 | Von Kohorn | |
| 4,289,532 A | 9/1981 | Matson et al. | |
| 4,298,379 A | 11/1981 | Zambrano | |
| 4,304,644 A | 12/1981 | Victorovich et al. | |
| 4,321,236 A | 3/1982 | Stambaugh et al. | |
| 4,331,635 A | 5/1982 | Arbiter et al. | |
| 4,352,574 A * | 10/1982 | Gjelsvik | 366/194 |
| 4,369,061 A | 1/1983 | Kerley, Jr. | |
| 4,372,918 A | 2/1983 | Woods et al. | |
| 4,374,101 A | 2/1983 | Lussiez et al. | |
| 4,384,889 A | 5/1983 | Wiewiorowski et al. | |
| 4,399,109 A | 8/1983 | Iler et al. | |
| 4,415,542 A | 11/1983 | Queneau et al. | |
| 4,423,011 A | 12/1983 | Baglin et al. | |
| 4,431,613 A | 2/1984 | Verbaan | |
| T104,001 I4 | 3/1984 | Kunter et al. | |
| 4,436,702 A | 3/1984 | Schulz et al. | |
| 4,437,953 A | 3/1984 | Newman et al. | |
| 4,438,076 A | 3/1984 | Pietsch et al. | |
| 4,442,072 A | 4/1984 | Baglin et al. | |
| 4,501,721 A | 2/1985 | Sherman et al. | |
| 4,507,274 A | 3/1985 | Broecker et al. | |
| 4,517,262 A | 5/1985 | Beidler | |
| 4,528,166 A | 7/1985 | McDougall | |
| 4,551,213 A | 11/1985 | Wilson | |
| 4,552,589 A | 11/1985 | Mason et al. | |
| 4,557,905 A | 12/1985 | Sherman et al. | |
| 4,559,209 A | 12/1985 | Muir et al. | |
| 4,571,262 A | 2/1986 | Kerfoot et al. | |
| 4,571,263 A | 2/1986 | Weir et al. | |
| 4,571,264 A | 2/1986 | Weir et al. | |
| 4,578,163 A | 3/1986 | Kunter et al. | |
| 4,587,110 A | 5/1986 | Potter et al. | |
| 4,592,779 A | 6/1986 | Russ et al. | |
| 4,594,102 A | 6/1986 | Weir et al. | |
| 4,595,566 A | 6/1986 | Byrd et al. | |
| 4,595,572 A | 6/1986 | Ogasa et al. | |
| 4,605,439 A | 8/1986 | Weir | |
| 4,605,537 A | 8/1986 | Touro | |
| 4,606,763 A | 8/1986 | Weir | |
| 4,606,766 A | 8/1986 | Genik-Sas-Berezowsky et al. | |
| 4,610,724 A | 9/1986 | Weir et al. | |
| 4,615,731 A | 10/1986 | Thomas et al. | |
| 4,629,502 A | 12/1986 | Sherman et al. | |
| 4,632,701 A | 12/1986 | Genik-Sas-Berezowsky et al. | |
| 4,647,307 A | 3/1987 | Raudsepp et al. | |
| 4,654,078 A | 3/1987 | Perez et al. | |
| 4,661,321 A | 4/1987 | Byrd et al. | |
| 4,723,998 A | 2/1988 | O'Neil | |
| 4,738,718 A | 4/1988 | Bakshani et al. | |
| 4,765,827 A | 8/1988 | Clough et al. | |
| 4,801,329 A | 1/1989 | Clough et al. | |
| 4,816,235 A | 3/1989 | Pesic | |
| 4,898,672 A * | 2/1990 | Clifft et al. | 210/614 |
| 4,902,345 A | 2/1990 | Ball et al. | |
| 4,923,510 A | 5/1990 | Ramadorai et al. | |

| | | |
|---|---|---|
| 4,925,485 A | 5/1990 | Schulze |
| 4,960,584 A * | 10/1990 | Brown ................. 423/658.5 |
| 4,968,008 A | 11/1990 | Emmett, Jr. et al. |
| 4,974,816 A | 12/1990 | Emmett, Jr. et al. |
| 4,979,987 A | 12/1990 | Mason et al. |
| 5,046,587 A | 9/1991 | Jones |
| 5,046,856 A * | 9/1991 | McIntire ................. 366/291 |
| 5,071,477 A | 12/1991 | Thomas et al. |
| 5,078,786 A | 1/1992 | Peters et al. |
| 5,114,687 A | 5/1992 | Han et al. |
| 5,127,942 A | 7/1992 | Brierley et al. |
| 5,136,784 A | 8/1992 | Marantz |
| 5,159,761 A | 11/1992 | Cagan |
| 5,215,575 A | 6/1993 | Butler |
| 5,223,024 A | 6/1993 | Jones |
| 5,232,491 A | 8/1993 | Corrans et al. |
| 5,236,492 A | 8/1993 | Shaw et al. |
| 5,256,189 A | 10/1993 | Patel et al. |
| 5,286,457 A | 2/1994 | Woodson et al. |
| 5,354,359 A | 10/1994 | Wan et al. |
| 5,458,315 A | 10/1995 | Blatz et al. |
| 5,458,866 A | 10/1995 | Simmons |
| 5,488,779 A | 2/1996 | Schultheis |
| 5,489,326 A | 2/1996 | Thomas et al. |
| 5,535,992 A | 7/1996 | Krause |
| 5,536,297 A | 7/1996 | Marchbank et al. |
| 5,536,480 A | 7/1996 | Simmons |
| 5,575,981 A | 11/1996 | Krause |
| 5,610,575 A | 3/1997 | Gioutsos |
| 5,628,431 A | 5/1997 | Roach et al. |
| 5,698,170 A | 12/1997 | King |
| 5,717,116 A | 2/1998 | Saito et al. |
| 5,855,858 A | 1/1999 | Jones |
| 5,902,474 A | 5/1999 | Jones |
| 5,919,674 A | 7/1999 | Tunley |
| 5,956,260 A | 9/1999 | Heger |
| 6,002,974 A | 12/1999 | Schiffmann |
| 6,080,300 A | 6/2000 | Goodwin |
| 6,183,706 B1 | 2/2001 | King |
| D444,286 S | 6/2001 | Ahne |
| 6,268,794 B1 | 7/2001 | Tzanev |
| 6,299,776 B1 * | 10/2001 | McWhirter et al. .......... 210/620 |
| 6,368,381 B1 | 4/2002 | King et al. |
| 6,395,063 B1 | 5/2002 | Cole |
| 6,456,194 B1 | 9/2002 | Carlson |
| 6,497,745 B2 | 12/2002 | Marsden et al. |
| 6,526,668 B1 | 3/2003 | Beckhart |
| 6,641,642 B2 | 11/2003 | Simmons et al. |
| 6,660,059 B2 | 12/2003 | Ji et al. |
| 6,680,035 B2 | 1/2004 | Arroyo et al. |
| 6,835,230 B2 | 12/2004 | Kanno et al. |
| 6,836,972 B2 | 1/2005 | Prahos |
| 6,888,034 B1 * | 5/2005 | Landray et al. ............... 568/357 |
| 7,033,480 B2 | 4/2006 | King |
| 7,037,357 B2 | 5/2006 | Ahern et al. |
| 7,040,603 B1 | 5/2006 | Tai et al. |
| 7,066,983 B2 | 6/2006 | Ji et al. |
| 7,285,256 B2 | 10/2007 | Wan et al. |
| 7,329,396 B2 | 2/2008 | Harris et al. |
| 7,604,783 B2 * | 10/2009 | King et al. ................. 423/36 |
| 2002/0020252 A1 * | 2/2002 | Dorlac et al. ................. 75/714 |
| 2002/0028164 A1 | 3/2002 | Schutte et al. |
| 2002/0092377 A1 | 7/2002 | Ji et al. |
| 2002/0152845 A1 | 10/2002 | Fleming et al. |
| 2003/0136225 A1 | 7/2003 | Simmons et al. |
| 2004/0115108 A1 | 6/2004 | Hackl et al. |
| 2004/0188334 A1 * | 9/2004 | McWhirter et al. .......... 210/219 |
| 2004/0206207 A1 | 10/2004 | Ji et al. |
| 2004/0256815 A1 | 12/2004 | Eichhorn |
| 2006/0133974 A1 | 6/2006 | Ji et al. |
| 2006/0228279 A1 | 10/2006 | Campbell et al. |
| 2007/0022843 A1 | 2/2007 | Bax et al. |
| 2007/0089566 A1 | 4/2007 | Hackl et al. |
| 2007/0137437 A1 | 6/2007 | Choi |
| 2008/0050293 A1 | 2/2008 | Dreisinger et al. |
| 2009/0019970 A1 | 1/2009 | Ritchie et al. |
| 2010/0024603 A1 * | 2/2010 | Ji et al. ................. 75/744 |

FOREIGN PATENT DOCUMENTS

| | | |
|---|---|---|
| CL | 35268 | 4/1986 |
| CL | 2998-01 | 4/2002 |
| CL | 278-02 | 11/2002 |
| CL | 1045-04 | 6/2005 |
| DE | 3808154 | 9/1989 |
| DE | 4336922 | 5/1995 |
| DE | 102004003952 | 8/2004 |
| DE | 10354888 | 6/2005 |
| EP | 0430813 | 6/1991 |
| GB | 1491651 | 11/1977 |
| GB | 1491851 | 11/1977 |
| GB | 1514794 | 6/1978 |
| JP | S58-035922 | 3/1983 |
| RU | 37700 | 5/2004 |
| WO | WO 91/11539 | 8/1991 |
| WO | WO 02/070756 | 9/2002 |
| WO | WO 03/060172 | 7/2003 |
| WO | WO 2005/042790 | 5/2005 |

OTHER PUBLICATIONS

Peacey et al. "Copper Hydrometallurgy—Current Status, Preliminary Economics, Future Direction and Positioning versus Smelting", available at http://www.hatch.ca/non_ferrous/articles/copper_hydrometallurgy.pdf, printed May 17, 2007, 32 pages.

U.S. Appl. No. 11/761,103, filed Jun. 11, 2007, Choi.

Official Action for Chilean Patent Application No. 691-2007, mailed Jun. 15, 2009.

Translation of Notification for Eurasian Patent Application No. 2008 01 985.

International Preliminary Report on Patentability for International (PCT) Patent Application No. PCT/IB2007/002995, mailed Feb. 25, 2010.

International Search Report for International (PCT) Patent Application No. PCT/IB2007/002995, mailed Apr. 28, 2008.

Written Opinion for International (PCT) Patent Application No. PCT/IB2007/002995, mailed Apr. 28, 2008.

Performance of a New Automatic Carbon Dioxide Coulometer; by E. W. D. Huffman, Jr., Microchemical Jr. 22, pp. 567-573.

Manual of Analytical Methods for the Uranium Concentrating Plant; by J. C. Ingles, Mines Branch Monograph 866, Mines Branch, Department of Mines and Technical Surveys, Ottawa, Canada, 1958, pp. 1-10.

The Sepon Copper Project: Development of a Flowsheet; by K. Baxter, D. Dreisinger and G. Pratt; vol. 2: Electrometallurgy and Environmental Hydrometallurgy, TMS (The Minerals, Metals & Materials Society), 2003.

Testing and Modelling a Novel Iron Control Concept in a Two-Stage Ferric Leach/Pressure Oxidation Process for the Sepon Copper Project; by K. G. Baxter, A. G. Pavilides, and D. G. Dixon, Pressure Hydrometallurgy 2004, 34th Annual Hydrometallurgy Meeting, Banff, Alberta, Canada.

Increasing the Capacity of Existing and New Exothermic Autoclave Circuits; by G. M. Dunn and H. W. Scriba, Pressure Hydrometallurgy 2004, 34th Annual Hydrometallurgy Meeting, Banff, Alberta, Canada.

High Temperature POX of Precious/Base Metal Concentrates From Newmont's Phoenix Project, Using Controlled Precipitation of Sulphate Species to Enhance Silver Recovery; by G. L. Simmons and J. C. Gathje, Pressure Hydrometallurgy 2004, 34th Annual Hydrometallurgy Meeting, Banff, Alberta, Canada.

Gold & Resource Developments Macraes Gold Project Pressure Oxidation Plant Designed and Constructed by Minproc; MGP Tech Flyer 3.

Design & Commissioning of the Macres Pressure Oxidation Circuit; by T. Giraudo, M. D. Cadzow, D. J. Lunt and T. W. Quaife, paper presented at Randol, 2000, Vancouver, Canada, Apr. 2000.

Sage Mill Patent Turns Waste to Ore; by L. W. Cope, ESMJ, Jan. 1998.

Process Principles in Minerals and Materials Production; by P. C. Hayes, Hayes Publishing Co., 52 Dewar Terrace, Sherwood, Queensland, 4075, Australia.

EKATO Pamphlet; "Mixing Update for Gassing Applications: EKATO'S Self-Aspirating Impeller System"; 2 pages, which is believed to have been published in 1997.

J.E. Dutrizac, *Converting jarosite residues into compact hematite products*, JOM, Jan. 1990, pp. 36-39.

J. Geldart, C.J. Ferron, C.A. Fleming, *Hydrothermal processing of Kidd Creek jarosites for stabilization and metal recovery*, in Iron Control and Disosal Sympositum, Ottawa, 1996, pp. 659-674.

W. Kunda, H. Veltman, *Decomposition of jarosite*, Metallurgical Transactions F, vol. 10B, Sep. 1979, pp. 439-446.

Weir, et al.; "Precious metals recovery from pressure oxidized Porgera cncentrates"; Minerals and Metallurgical Processing, Nov. 1986, 3 pages.

D. Adams, M. Preston, T. Post, P. Kubera, *Mixing Optimization of High Pressure Oxidation of Gold Ore Slurries*, Randol Gold & Silver Forum '98, pp. 217-221.

Official Action for Australian Patent Application No. 200725886, dated Jun. 10, 2010.

Official Action for Canadian Patent Application No. 2,646,137, dated May 17, 2010.

English Translation of Official Letter for Eurasian Patent Application No. 2008 01 985, date unknown.

Official Action (including translation) for Japanese Patent Application No. 2008-558945, mailed Mar. 8, 2011.

Notice of Acceptance for Australian Patent Application No. 2007258886, dated Feb. 24, 2011.

McMullen et al., "Gold Roasting, Autoclaving or Bio-Oxidation Process Selection Based on Bench-Scale and Pilot Plant Test Work and Costs," Mineral Processing Plant Design, Practice, and Control Proceedings, vol. 1, Mular et al., eds., Society for Mining, Metallurgy, and Exploration, Inc., 2002, pp. 211-250.

Notice of Allowance for Canadian Patent Application No. 2,646,137, dated Jun. 9, 2011.

* cited by examiner

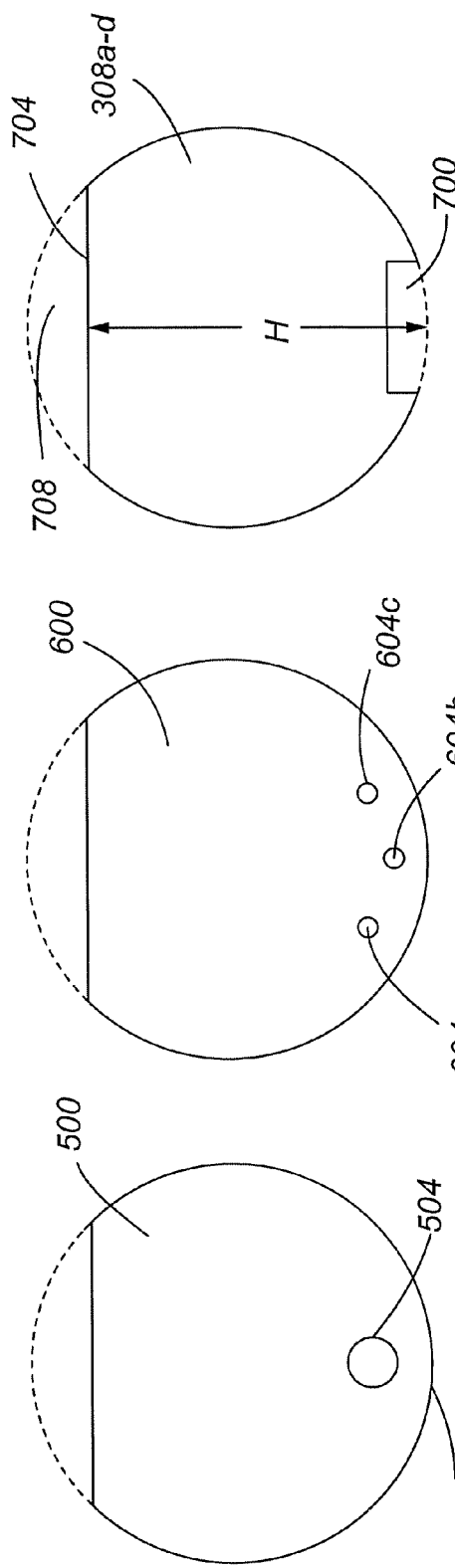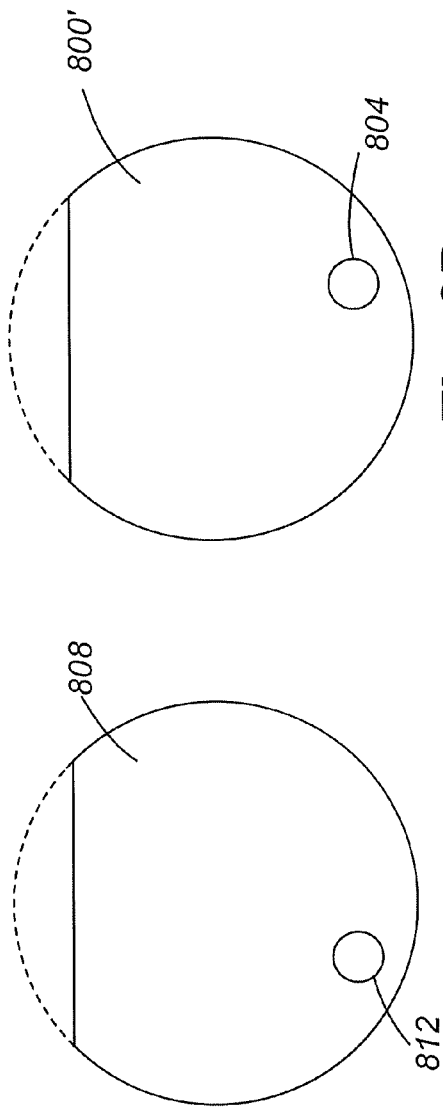

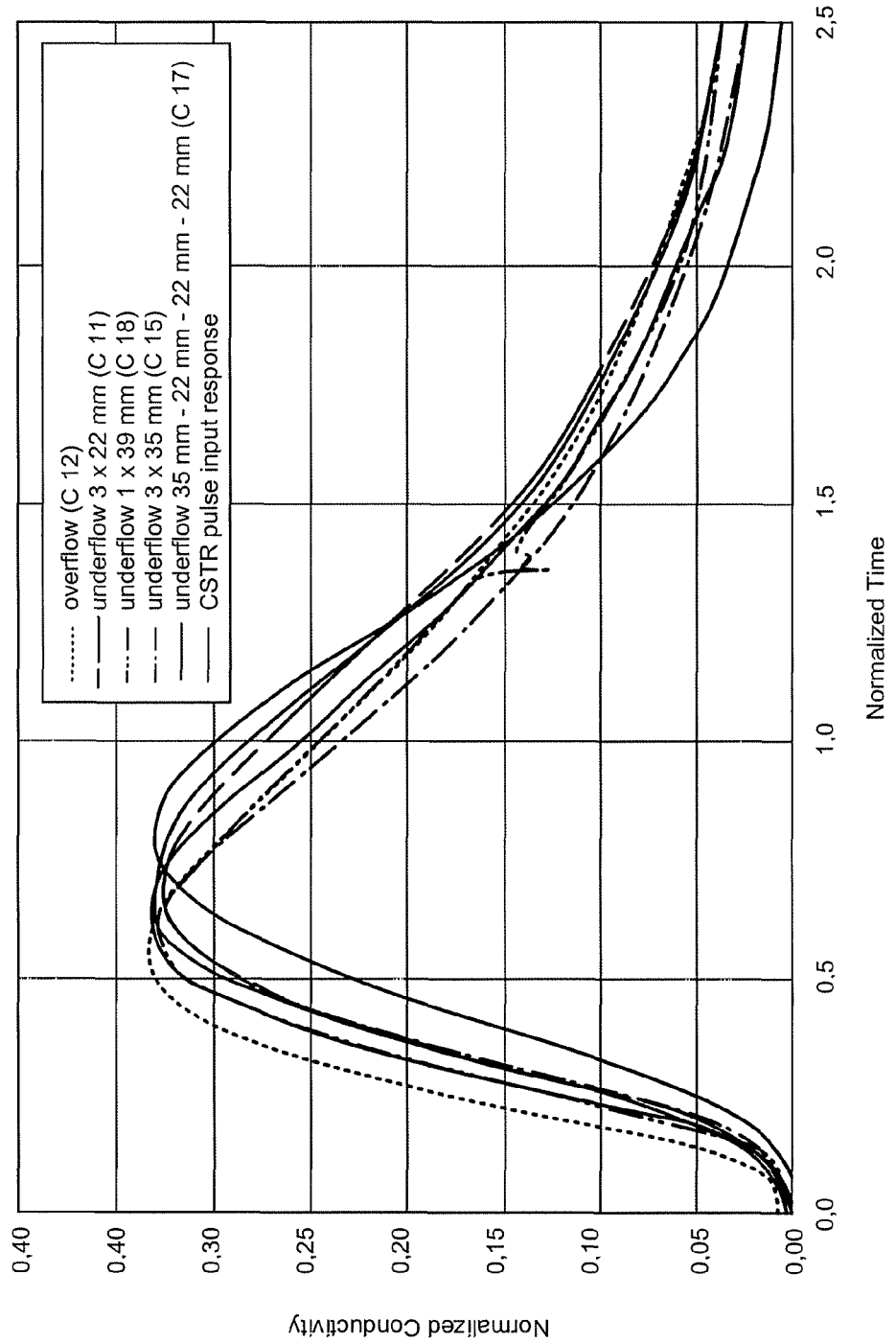
Fig. 9 Comparison of the pulse input response for the overflow and different underflow arrangements at the same conditions (specific power input).

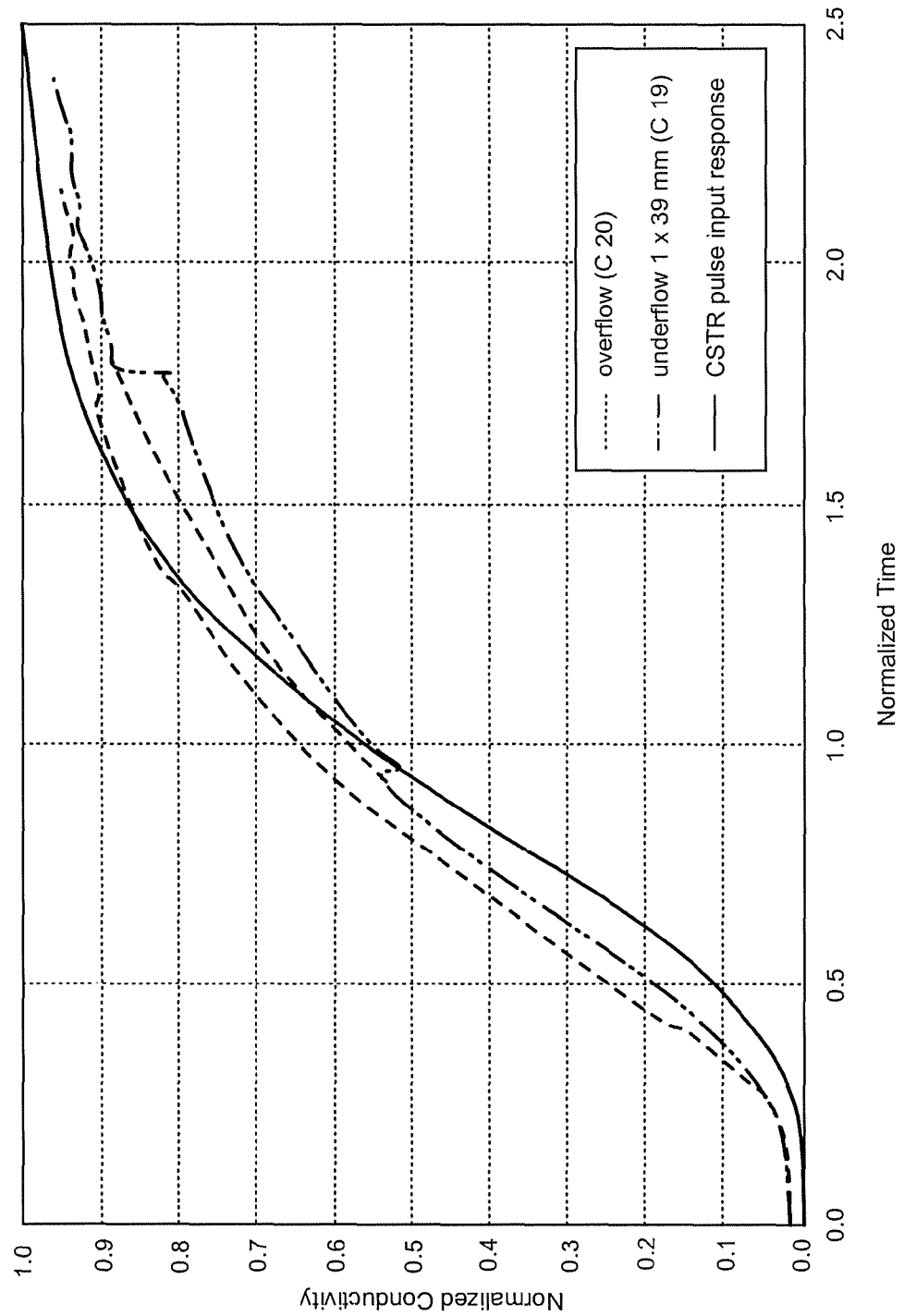
Fig. 10 Comparison of the step input response for the overflow and different underflow arrangements at the same conditions (specific power input).

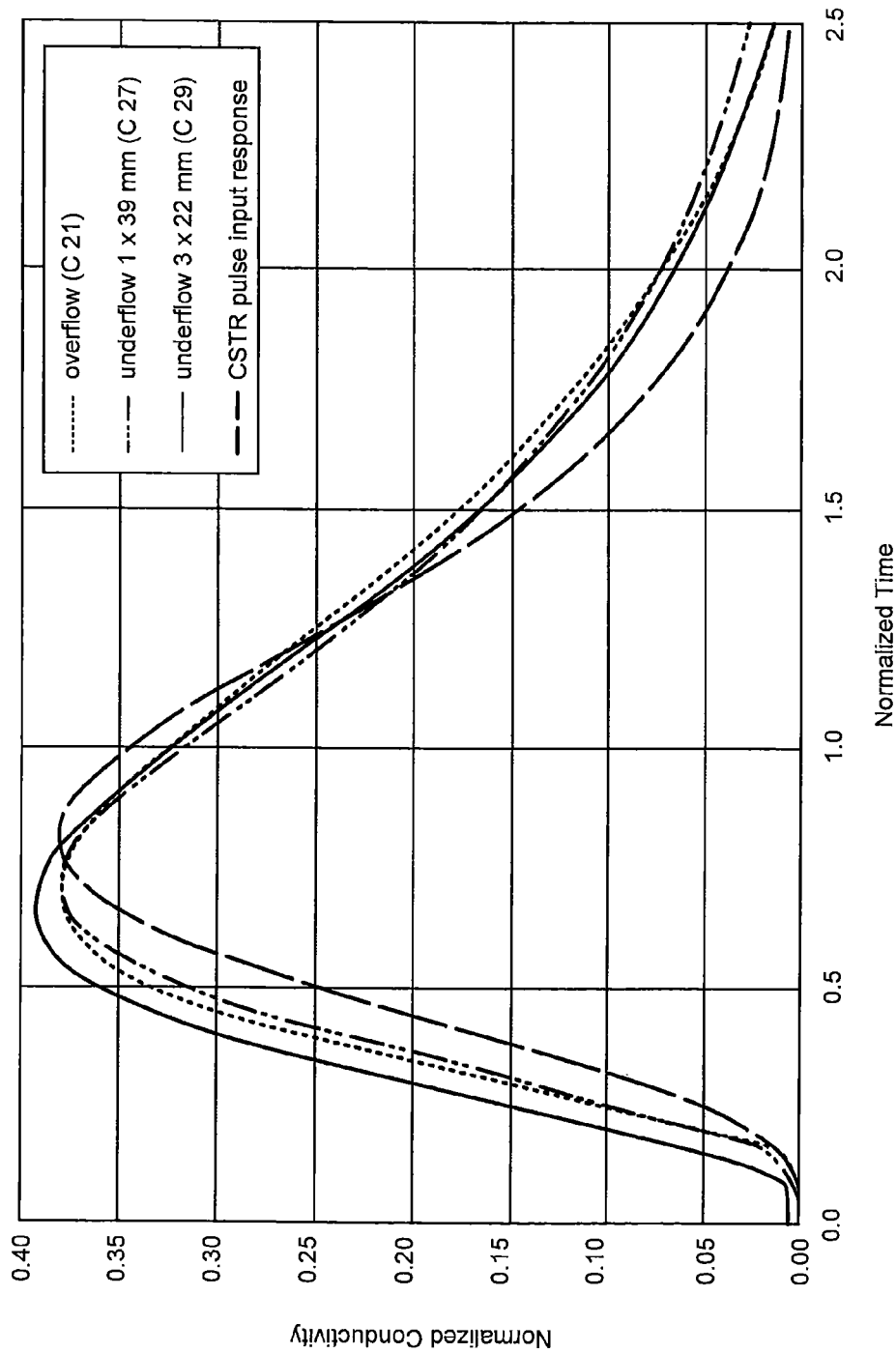
Fig. 11 Comparison of the pulse input response for the overflow and different underflow arrangements at the same conditions (wave number).

Comparison of the step input response for the overflow and different underflow arrangements at the same conditions (wave number).

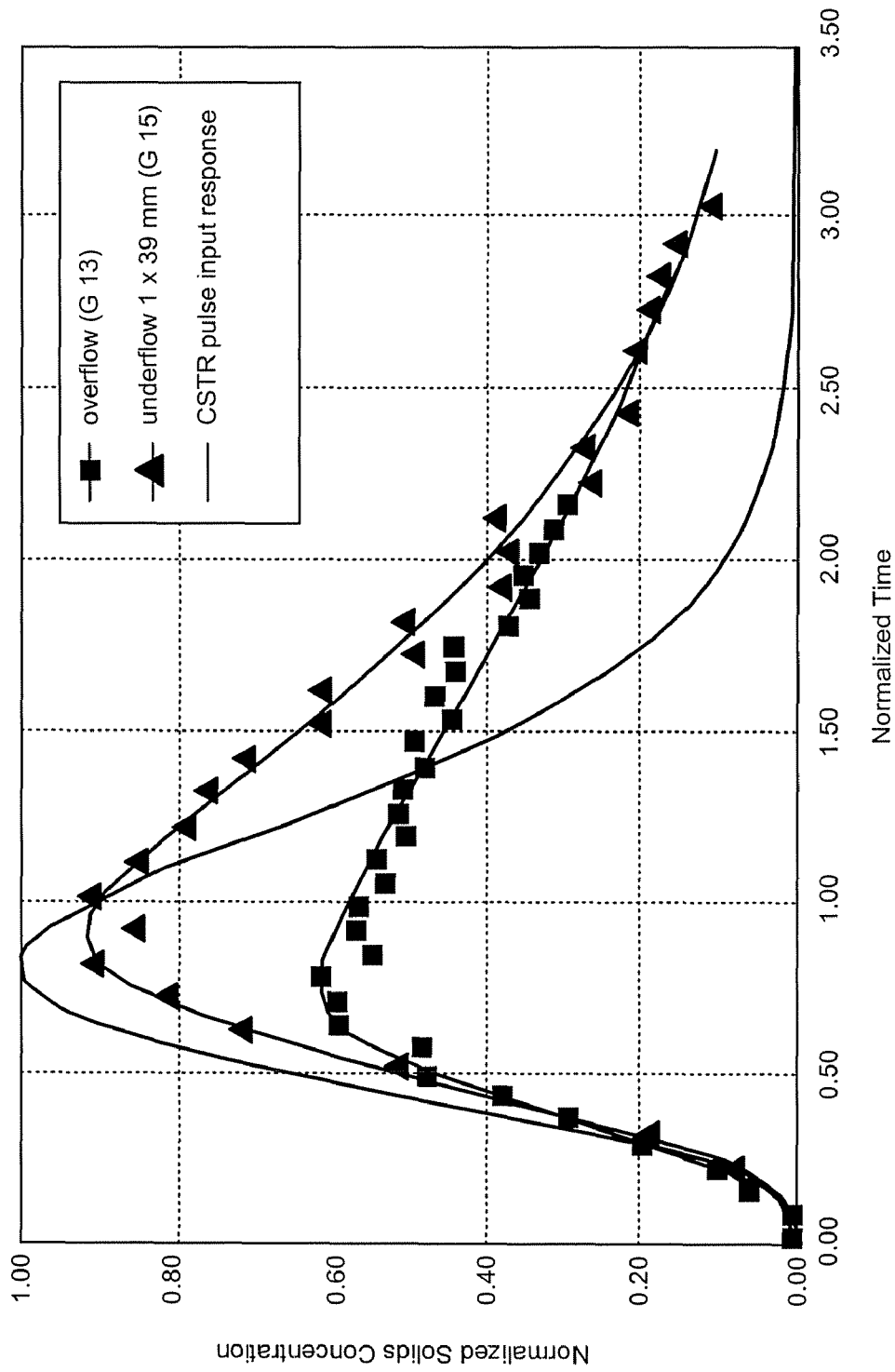
Fig. 14  Comparison of the pulse input response with solids for the overflow and different underflow arrangements at the same conditions (specific power input).

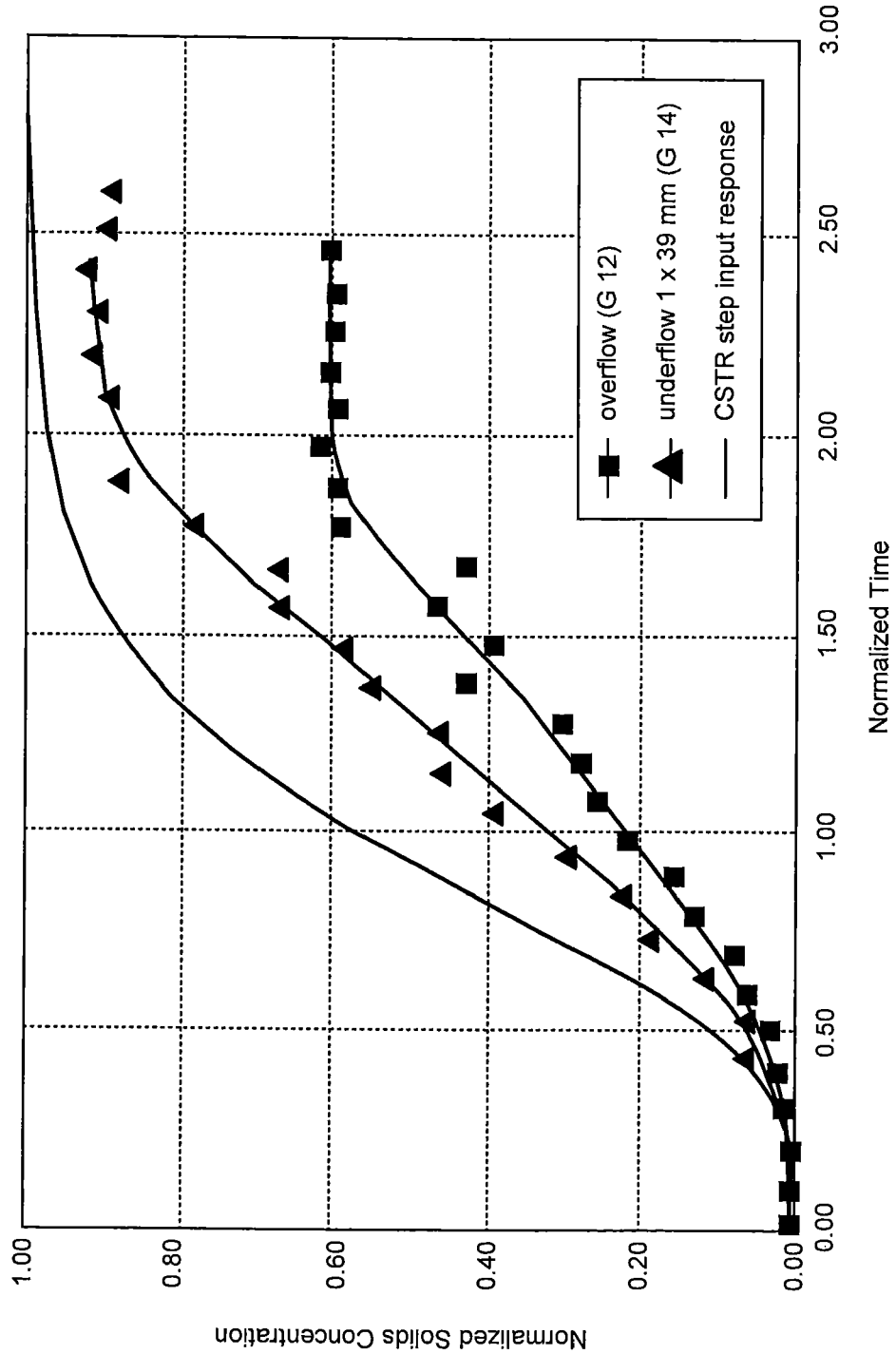
Fig. 15  Comparison of the step input response with solids for the overflow and different underflow arrangements at the same conditions (wave number).

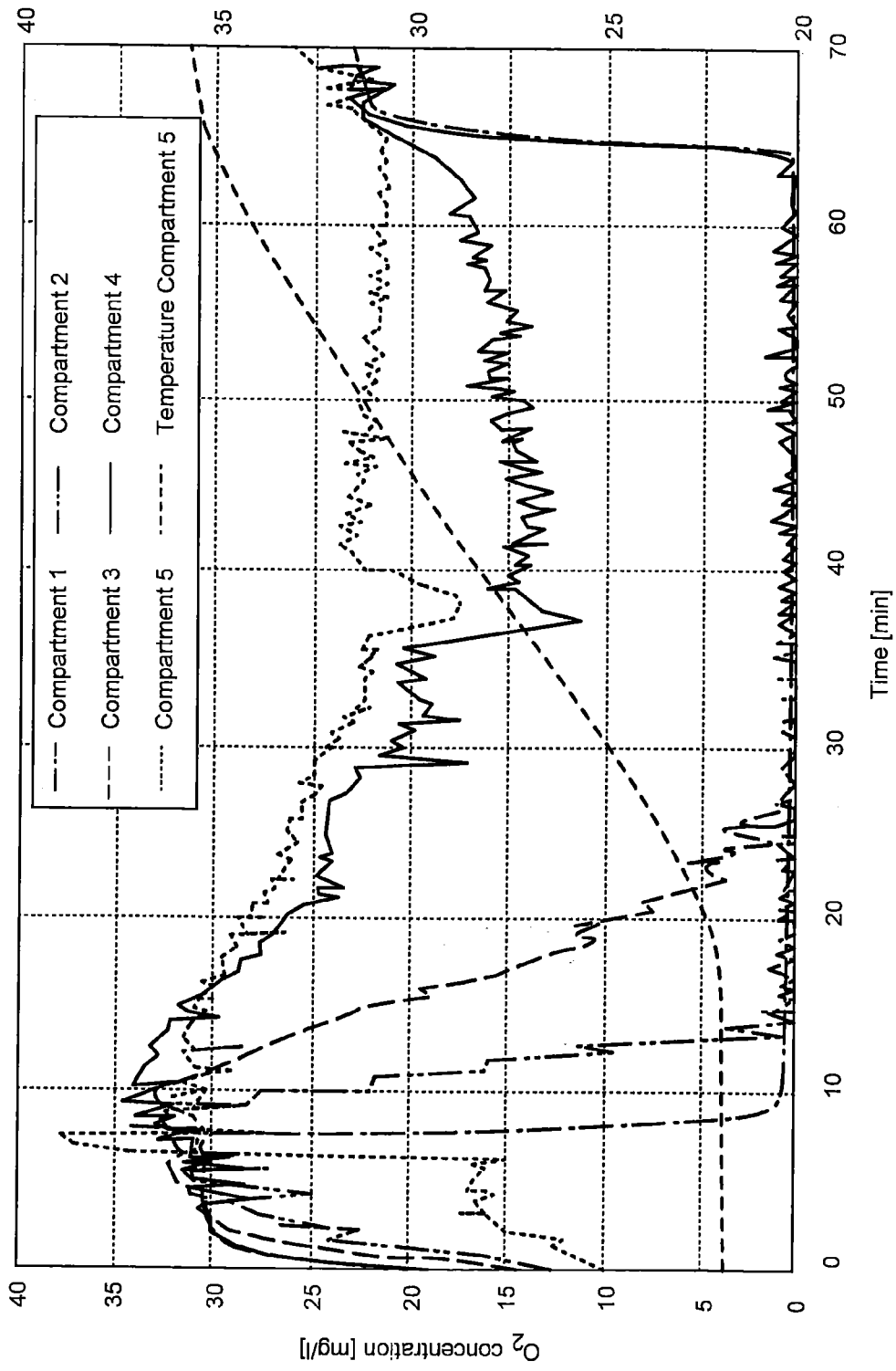
Fig. 16  Dissolved oxygen concentration in test MT 3.

AUTOCLAVE WITH UNDERFLOW DIVIDERS

CROSS REFERENCE TO RELATED APPLICATION

The present application claims the benefits of U.S. Provisional Application Ser. No. 60/783,295, filed Mar. 17, 2006, entitled "Autoclave with Underflow Dividers", which is incorporated herein by this reference.

FIELD OF THE INVENTION

The invention relates generally to reactors and particularly to superatmospheric reactors, especially autoclaves.

BACKGROUND OF THE INVENTION

Autoclave reactors have a wide range of applications in chemical processes. A typical autoclave has one or more compartments and operates at elevated pressures and temperatures. Most autoclaves are heated by steam injection, autogenous heat generated by reactions within the autoclave, or by a combination of both.

In most applications, autoclaves are stirred, multi-compartment reactors. An example of a multi-compartment, cylindrical autoclave is shown in FIGS. 1 and 2. The reactor 100 has a plurality of compartments 104a-f, each compartment 104 having at least one agitator 108a-g. In most applications, the agitators 108a-g rotate in the same direction. Adjacent compartments 104a-f are separated by a divider 112a-3 configured as an overflow weir. The input slurry 116 moves from compartment to compartment by overflowing the weirs as shown by the arrows in FIG. 1. To permit cascading flow of the slurry from compartment to compartment, the liquid level in the various compartments varies in a step-wise fashion, with the first compartment 104a having a higher liquid level than the second compartment 104b, the second compartment 104b having a higher liquid level than the third compartment 104c, and so on, with the sixth compartment 104f having the lowest liquid level.

An example of an overflow weir-type divider 112 is shown in FIG. 2. The divider 112 is cylindrically shaped to match the cylindrical profile of the autoclave and has a notch 200 located at the top of the divider. Liquid flows though the notch to move to the next (downstream) compartment. There is a sufficient height differential between notches in consecutive overflow weirs so that backmixing of liquid cannot occur and positive flow and flow through the vessel is maintained. To provide the desired step-wise gradient in liquid levels from compartment to compartment, the heights of the notches 200 in the compartments vary in the same manner as the liquid level, with the notch 200 in the first divider 112a between the first and second compartments being higher than the notch 200 in the second divider 112b, which in turn is higher than the notch in divider 112c and so on.

An example of a typical chemical reaction for an autoclave reactor is the pressure oxidation of sulfide sulfur to cause dissolution and/or liberation of base and precious metals from sulfide sulfur compounds. Pressure oxidation is typically performed by passing the input slurry 116, which contains a base and/or precious metal-containing material (such as base and/or precious metal ores and concentrates), through the sealed autoclave (operating at superatmospheric pressure) and sulfuric acid. To provide for oxidation of the sulfide sulfur in the slurry, a molecular oxygen-containing gas 120 is typically fed continuously to the autoclave by means of a sparge tube (not shown) located below each agitator. The molecular oxygen and elevated temperature cause relatively rapid oxidation of the sulfide sulfur to form sulfuric acid and the metal sulfides to form metal sulfates, which are soluble in the acidic slurry, thereby forming a pregnant leach solution. The pregnant leach solution, which commonly contains from about 10 to about 100 grams/liter sulfuric acid, from about 5 to about 100 grams/liter dissolved metal, and from about 4 to about 50% solids by weight, is removed from the last compartment of the autoclave as an output slurry 124. Additional details about this process are discussed in U.S. Pat. No. 5,698,170 to King, which is incorporated herein by reference. To maintain a desired pressure and atmospheric gas composition in the autoclave, the gas in the autoclave is continuously or periodically vented as an off gas 128. One autoclave configuration is discussed in U.S. Pat. Nos. 6,368,381 and 6,183,706.

In designing an autoclave reactor, there are a member of considerations. For example, it is desirable that the slurry have an adequate residence time in each of the compartments. Short circuiting, or moving to the next compartment with an unacceptably short residence time in a compartment, can cause a substantial decrease in metal extraction levels. For best results, the Residence Time Distribution or RDT in each compartment should be as close as possible to ideal plug flow conditions. It is desirable to have, in each compartment, sufficient power input and mixing efficiency to provide a high degree of reaction of the molecular oxygen with sulfide sulfur. To provide a high mixing efficiency, it is common practice to impart high levels of power to the agitators, thereby causing a highly turbulent surface in each compartment.

SUMMARY OF THE INVENTION

These and other needs are addressed by the various embodiments and configurations of the present invention. The present invention is directed generally to an autoclave having underflow openings in inter-compartment dividers. As used herein, "underflow" refers to subsurface flow of a liquid between autoclave compartments.

In one embodiment, the autoclave includes:
(a) a plurality of compartments;
(b) a plurality of agitators positioned in the compartments; and
(c) a plurality of dividers separating the compartments.

Each of the dividers includes one or more underflow openings. A feed stream flows between adjacent compartments by passing through the underflow opening(s) in the divider separating the adjacent compartments.

To inhibit overflow of the dividers, each of the dividers is set at a level such that it is significantly higher than any wave action that is present due to the highly turbulent surface in the adjacent upstream compartments. The height of the divider is such that free movement of the gas phase along the length of the autoclave is maintained. Although liquid level in the compartments varies from compartment to compartment, the difference in liquid levels between adjacent compartments with underflow type weir dividers is generally less than the liquid level difference between adjacent compartments for overflow weir-type dividers. The lower head drop between compartments for underflow dividers can provide more operating volume (typically at least about 2% more) in the autoclave when compared with an autoclave equipped with standard overflow weirs-type dividers (hereinafter "overflow weirs").

To substantially maximize volumetric flow through the autoclave while substantially minimizing short-circuiting and back-mixing, in each of the underflow dividers, the cumulative cross-sectional area of the underflow opening(s) is sized using standard fluid dynamics engineering such that the head drop between compartments is maintained in the range of about 25 to 100 mm. If the openings are made smaller than optimum, the head differential between compartments increases; the advantage of reduced head loss between compartments compared to the overflow configuration is then lost. If the openings are made larger than optimum, the head differential between compartments is further reduced, but this advantage can be more than offset by increased backmixing/short-circuiting created by the larger underflow openings. The cumulative cross-sectional area of the underflow opening(s) in each of the dividers is substantially the same.

The position of the underflow openings in the dividers can be important. Preferably in each of the dividers, the underflow opening(s) is positioned above the bottom of the autoclave at a height that is no more than about 20% of the liquid level in the adjacent, upstream compartment. More preferably in each of the dividers, the underflow opening(s) is positioned at or below an uppermost impeller blade of the agitator in the adjacent, upstream compartment.

In one autoclave configuration, the agitators counter-rotate and the underflow openings in successive dividers are spatially offset relative to the longitudinal axis of the autoclave. In a preferred autoclave design, a first agitator in a first compartment rotates clockwise and the underflow opening(s) in a first divider, separating the first compartment from an adjacent second compartment, is positioned to the right of the longitudinal axis of flow down the autoclave and, a second agitator in the second compartment rotates counterclockwise and the underflow opening(s) in a second divider separating the second compartment from an adjacent third compartment, is positioned to the left of the longitudinal axis of the autoclave.

The autoclave can have a number of advantages. For example, the underflow dividers can provide significantly reduced levels of short-circuiting between compartments when compared with overflow weirs. The RTD in compartments separated by underflow dividers is generally closer to ideal plug flow conditions than in compartments separated by overflow weirs. Under identical agitation and aeration conditions, higher mass transfer coefficients can be realized in compartments separated by underflow dividers when compared to compartments separated by overflow weirs. Underflow dividers can inhibit solids build up in compartments. Overflow weir dividers can inhibit the flow of coarser particles through the autoclave. Coarse particles may comprise tramp oversize naturally present in the autoclave feed, dislodged scale build up, or aggregates of feed particles formed in the autoclave. The underflow weir configuration promotes the movement of such coarse particles down the axis of the autoclave to be removed in the autoclave discharge. Non-removal of coarse particles may reduce effective operating volume and may promote abrasion of the autoclave agitator blades and the autoclave lining. When compared to standard overflow weir-type dividers, underflow dividers are thus easier to design and construct. Typically, overflow weir dividers must be designed to support the full head of liquid slurry in the upstream compartment. With underflow weir divers, this head differential between adjacent compartments cannot develop. Thus, underflow weir dividers require less wall thickness and fewer structural members. With underflow weir dividers, when the autoclave is taken out of service for maintenance, slurry can be more readily removed from the autoclave without lengthy and labor-intensive liquid and solid removal procedures for each individual compartment.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 5 is a front view of a divider according to an embodiment of the present invention;

FIG. 6 is a front view of a divider according to an embodiment of the present invention;

FIG. 7 is a front view of a divider according to an embodiment of the present invention;

FIG. 8A is a front view of a divider according to an embodiment of the present invention;

FIG. 8B is a front view of a divider according to an embodiment of the present invention;

FIG. 9 is a plot of normalized conductivity (vertical axis) against normalized time (horizontal axis) to compare the pulse input response for the overflow and different underflow arrangements at the same conditions (power input);

FIG. 10 is a plot of normalized conductivity (vertical axis) against normalized time (horizontal axis) to compare the step input response for the overflow and different underflow arrangements at the same conditions (power input);

FIG. 11 is a plot of normalized conductivity (vertical axis) against normalized time (horizontal axis) to compare the pulse input response for the overflow and different underflow arrangements at the same conditions (wave number);

FIG. 14 is a plot of normalized conductivity (vertical axis) against normalized time (horizontal axis) to compare the step input response for the overflow and different underflow arrangements at the same conditions (specific power input);

FIG. 15 is a plot of normalized solids concentration (vertical axis) against normalized time (horizontal axis) to compare the pulse input response with solids for the overflow and different underflow arrangements at the same conditions (wave number); and FIG. 16 is a plot of molecular oxygen ($O_2$) concentration (mg/l) against dissolved molecular oxygen concentration in test MT 3.

DETAILED DESCRIPTION

Figure 1:
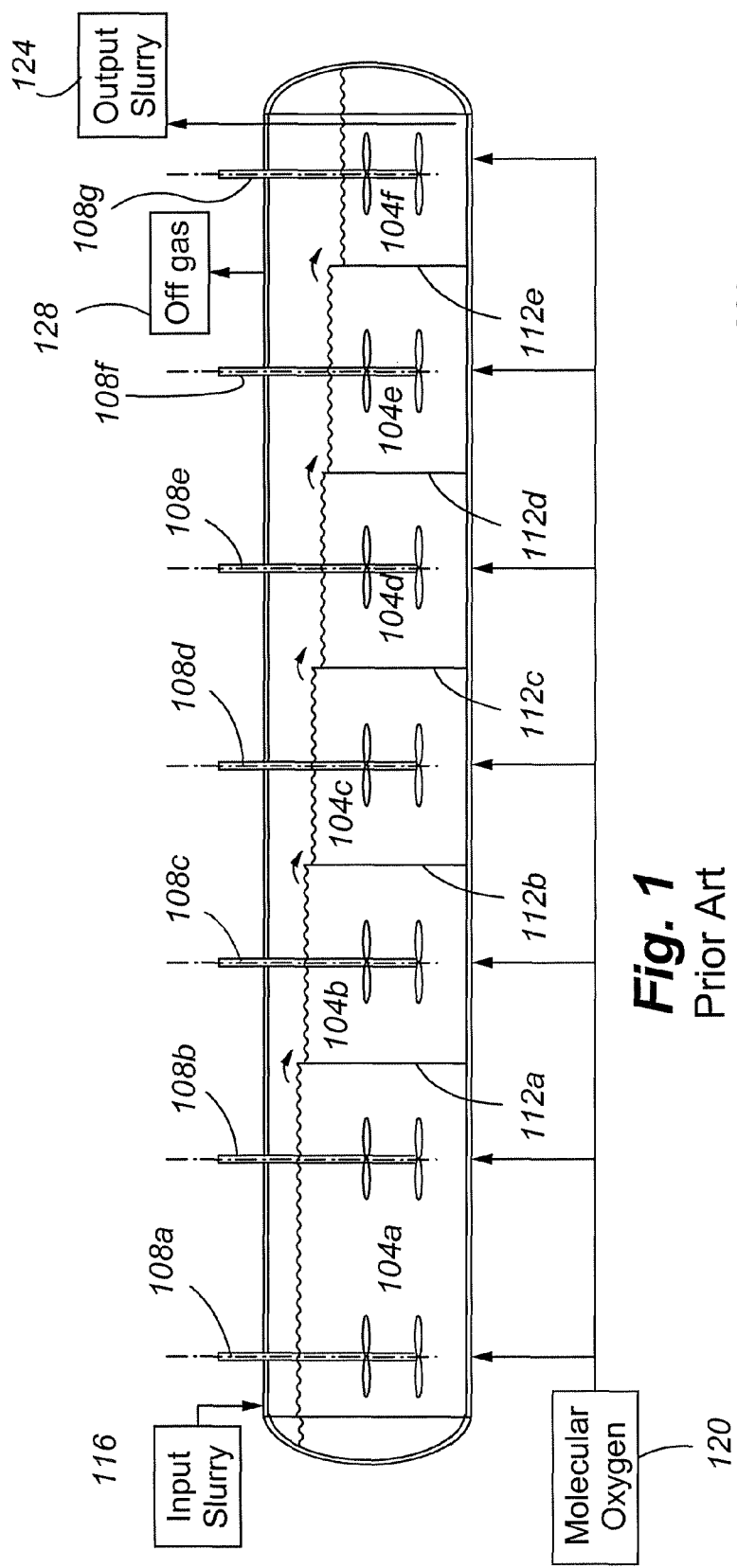
FIG. 1 is a cross-sectional view of an autoclave according to the prior art.
Figure 2:
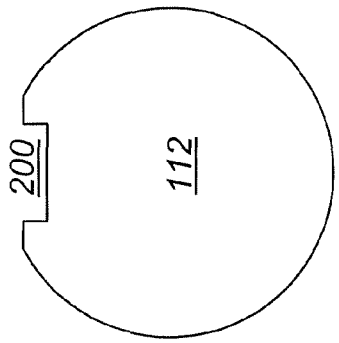
FIG. 2 is a front view of an overflow weir according to the prior art.
Figure 3:
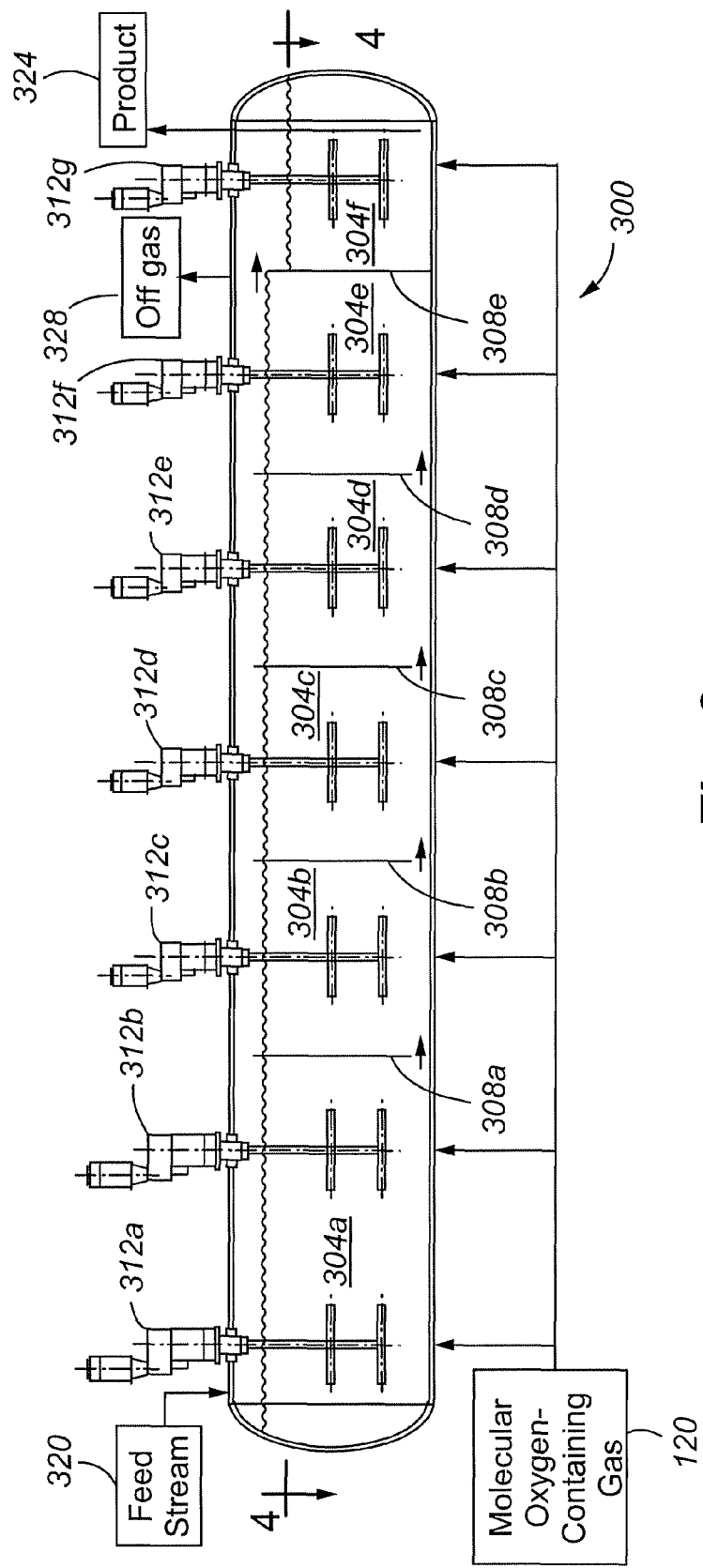
FIG. 3 is a cross-sectional view of an autoclave along line 3-3 of FIG. 4 according to an embodiment of the present invention.

An embodiment of the present invention will be discussed with reference to FIGS. 3-5. The autoclave 300 of a first embodiment of the present invention includes a plurality of compartments 304a-f separated by dividers 308a-e. Although the autoclave is shown as having only five compartments, it is to be understood that the autoclave can have more or fewer than five compartments, depending on the application. As can be seen by the arrows in FIG. 3, the dividers 308a-d are underflow dividers while the last divider 308f may be an overflow weir (such as the weir of FIG. 2). The use of an overflow divider between the last compartment and the next-to-last compartment can help provide a wider variation and greater sensitivity in liquid level in the last compartment, which will facilitate dynamic level control driving periods of fluctuating flow of the feed stream. The provision of an overflow divider in the last compartment is deemed less necessary as the member of autoclave compartments is reduced. Because the use of an overflow divider in the last compartment can cause a loss of autoclave operating volume, the (last) divider between the last compartment and the next-to-last compartment can be an underflow divider. Although the underflow divider can provide a greater operating volume in the autoclave, it can require the entire autoclave to be used for level control. Thus, level control using an underflow design in the last divider may not be as precise or sensitive as an overflow design. A number of agitators 312a-g are located in the various compartments 304a-f. A molecular oxygen-containing gas 120 is introduced into each compartment via a sparge tube (not shown) positioned in spatial proximity to each agitator. A feed stream 320 is introduced into the first compartment 304a and moves in stepwise fashion through the autoclave 300 to the final compartment 304f. A product 324 is removed from the final compartment 304f, and an off gas 328 is vented from the autoclave as discussed above.

The feed stream 320 is in the form of a liquid and may by a slurry containing solid particles. The feed stream 320 contains chemical species to be converted into a desired set of chemical compounds in the product 324. In a typical application, the feed stream 320 includes base, platinum group, and/or precious metal sulfides in ore and/or concentrate particles. Under the elevated temperatures and pressures of the autoclave, the sulfide sulfur oxidized by molecular oxygen to sulfuric acid and metal sulfides to metal sulfates, which are soluble in the liquid component of the feed stream 320. The metals are thereby introduced into the liquid component as dissolved species. The product 324 is typically referred to as a pregnant leach solution. The dissolved metals can then be recovered by known techniques, including ion exchange, solvent extraction, electrowinning, cementation, precipitation, and combinations thereof. Although the autoclave of the present invention is discussed with reference to leaching of metals from metal-containing particles, it is to be understood that the autoclave can be used in a number of other reactions commonly carried out in autoclaves, such as catalytic chemistry reactions (e.g., the conversion of ferrous to ferric ions, reoxidation of NO by molecular oxygen, and cuprous amine conversion to cupric amine).

The agitators 312a-g can be any suitable impeller design that efficiently promotes gas/liquid transfer and adequate mixing of the liquid or slurry feed, such as impellers manufactured by RUSHTON™ or EKATO™. The impeller may also be a gassing impeller, such as the impeller discussed in U.S. Pat. Nos. 6,368,381 and 6,183,706, both to King, et al.

The vent 328 may be located at any point along the autoclave and releases inert gases, such as carbon dioxide, nitrogen, and argon, which would otherwise build up to unacceptable partial pressures within the autoclave. In metal sulfide leaching, the atmosphere of the autoclave typically contains steam, molecular oxygen and inert gases. The carbon dioxide is evolved by the destruction of carbonate minerals in the autoclave feed by the acid present in the autoclave oxidized slurry. Nitrogen and argon can be present as impurities in the oxygen supply. The vent is preferably located near the input end of the autoclave because most of the carbon dioxide is evolved in the initial compartments. This location of the vent allows generally a higher carbon dioxide-to-molecular oxygen ratio in the vent gas which substantially minimizes the overall molecular oxygen consumption in the sulfur oxidation reaction.

The autoclave gas atmosphere is controlled by oxygen addition and the molecular ratio of oxygen to inert gases is typically maintained at least 1 molecular oxygen to 1 inert gas. The ratio of steam partial pressure to molecular oxygen plus inert gas total pressure will vary widely depending on the operating temperature of the autoclave, but typically this ratio can vary from 3 steam to 1 ($O_2$+inert) gas to 10 steam to 1 ($O_2$+inert) gas.

The underflow dividers 308a-d are shown in FIG. 7. The dividers are circular in shape to engage the walls of the autoclave 300 and do not have an overflow notch located at the top of the divider. Rather, movement of the feed stream 320 from compartment to compartment is effected by an underflow opening 700 positioned towards the bottom of the divider. Preferably, at least most, more preferably at least about 75%, and even more preferably all of the feed stream passing between adjacent compartments passes through the underflow opening(s) in the divider separating the compartments. Stated another way, the height "H" of the divider above the bottom of the autoclave is higher than the liquid level (preferably including the maximum wave height from agitation) in the upstream autoclave compartment so that the feed stream 320 does not overflow the top 704 of the divider. To avoid the liquid overflowing the dividers, the dividers preferably have a height-to-diameter ratio of at least about 0.80 and more preferably ranging from about 0.80 to about 0.98. To permit inter-compartment communication of the gas atmosphere, an opening 708 is located above the top 704 of the divider.

While not wishing to be bound by any theory, it is believed that the underflow divider configuration provides a more desirable RTD when compared to an overflow weir configuration because of the pronounced surface movement or turbulence induced by the agitators. In overflow weirs, the surface turbulence is believed to cause the feed stream to wash over the notch, causing short circuiting. By properly sizing and locating the underflow opening in the divider, the incidence of short circuiting can be significantly reduced over levels experienced in autoclaves equipped with overflow weirs.

The cumulative underflow opening size or cross-sectional area in a divider has a pronounced impact on the RTD of the feed stream in a given compartment and the capacity of the autoclave. If the opening size is too large relative to the head of the feed stream (i.e., the head is proportional to the level of the feed stream above the opening), the incidents of both short circuiting of the feed stream from the upstream compartment to the downstream compartment and back mixing of feed stream from the downstream compartment to the upstream compartment will increase. If the opening size is too small relative to the head of the feed stream, the throughput of the feed stream, or the autoclave capacity, will be far less than optimal. Preferably, the opening size is selected to provide a selected inter-compartment flow volume in the autoclave while maintaining the head in each compartment as low as possible. More preferably, the flow ranges from about 70 to about 100% and even more preferably from about 90 to about 100%. The head is selected so as not to produce too much resistance to flow and thereby favorably approximate ideal plug flow conditions. Typically, the head ranges from about 50 mm to about 150 mm and even more typically from about 5 mm to about 50 mm and, typically, a head drop between adjacent pairs of compartments is maintained in a range from about 25 to about 100 mm. Preferably, the cumulative cross-sectional area of the underflow openings in a divider ranges from about 0.06 $m^2$ to about 1.50 $m^2$. Using well known fluid dynamic equations, the preferred cumulative underflow opening cross-sectional area (in a unit $m^2$) in a ratio to slurry flowrate (in a unit $m^3$/sec) between compartments in a given divider ranges preferably from about 1.0 to about 7.0 and even more preferably from about 2.0 to about 7.0. To provide uniform flow characteristics in the various compartments, the underflow openings in the various dividers normally have approximately the same cross-sectional area, and even more preferably the openings in each divider have cross-sectional areas that vary no more than about 25% and even more preferably no more than about 10% in magnitude from one another.

It is to be understood that the area of the underflow aperture is a function of the flow rate between adjacent compartments. This will vary down the length of the autoclave due to quench water additions to each compartment. Intercompartment flow rates may be calculated from anticipated temperature profile and quench water addition down the autoclave. The net result of these factors is a progressive increase in underflow aperture area from the first (upstream) divider to the last (downstream) divider. Thus, the cumulative underflow aperture area in the first divider is typically less than that in the second divider, the cumulative underflow aperture area in the second divider is typically less than that in the third divider, and so on.

The preferred location of the underflow openings relative to the impeller blade location is at or below the uppermost impeller blades. As will be appreciated, some agitators have an inteiprop design having upper and lower sets of blades. Other agitators have only a single set of blades. In the former case, it is preferred that the opening be at or below the upper set of blades. In the latter case, it is preferred that the opening be at or below the single set of blades. These positions of the underflow openings permit compartment-to-compartment drainage and inhibit build-up of solids in each compartment. More preferably, it is preferred that the opening be positioned at a height (above the bottom of the autoclave) that is no more than about 66% and even more preferably no more than about 33% of the liquid level in the upstream compartment.

The liquid levels in the compartments vary to provide the head needed for flow to occur from the first to the last autoclave compartment. Thus, the liquid level in the first compartment is higher than the liquid level in the second compartment, the liquid level in the second compartment is higher than the liquid level in the third compartment, and so on. The typical difference in liquid levels between adjacent compartments ranges from about 5 mm to about 150 mm and more typically from about 5 to about 50 mm. The difference in liquid levels across a divider preferably yields a flow volume between adjacent compartments ranges from about 200 $m^3$/hour to about 800 $m^3$/hour.

FIGS. 5 and 6 depict other underflow opening designs. In FIG. 5, the opening 504 in the divider 500 is arcuate or circular in shape and is positioned above the bottom 508 of the autoclave. The opening 504 is positioned substantially along the vertical centerline of the divider 500. In FIG. 6, the underflow opening is designed as a series of equally sized openings 604a-c, which collectively provide the desired cross-sectional area of flow through the divider 600. Although only three openings are depicted, it is to be understood that any number and shapes (e.g., circular, rectangular, square, elliptical, etc.) of openings can be used provided that the cross-sectional area of each opening is large enough to pass at least most of the particulates in the feed stream.

Figure 4:
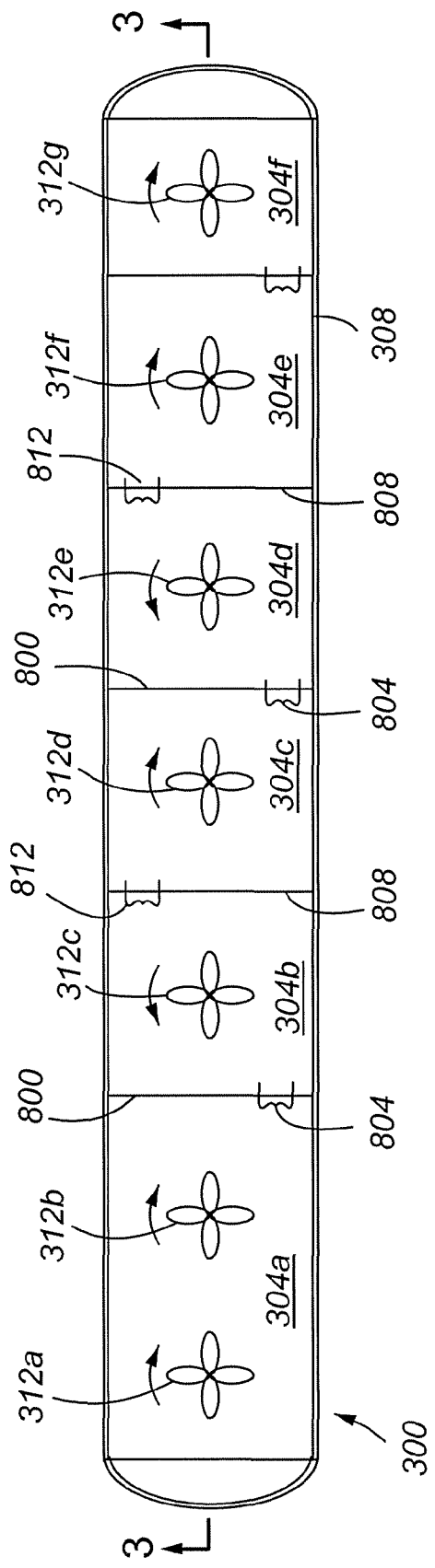
FIG. 4 is a plan view of an autoclave along line 4-4 of FIG. 3 according to the embodiment.

In one configuration shown in FIGS. 4 and 8A-B, the positions of the underflow openings depend upon the agitator rotational direction. FIG. 8A shows a divider 808 having an underflow opening 812 positioned to the left of the vertical center line of the divider 808 and of the longitudinal axis of the autoclave while FIG. 8B shows a divider 800 having an underflow opening 804 positioned to the right of the vertical center line of the divider and of the longitudinal axis of the autoclave. As can be seen from FIG. 4, the rotational directions of the agitators vary compartment-by-compartment. Thus, in the first compartment 304a, the agitators 312a,b rotate in a first direction (shown as being clockwise), in the second compartment 304b the agitator 312c rotates in a second (opposite) direction (shown as being counterclockwise), and so on. Because the final divider 308 is configured as an overflow weir, such as that shown in FIG. 2, the rotational directions in the last two compartments 304e,f may be the same as shown.

While not wishing to be bound by any theory, it is believed that positioning the underflow opening at the point where the liquid pressure is greatest in response to the movement of the agitator effectively "pumps" the feed stream from compartment-to-compartment. In this manner, head alone is not the only motive force causing inter-compartment flow of the feed stream. Agitators in adjacent compartments counter-rotate to reduce the incidence of back mixing. Underflow openings in adjacent dividers are spatially offset from one another to prevent the feed stream from being "pushed" too quickly from one compartment to another (or short circuiting) through the axially aligned underflow openings.

In operation, the feed stream 320 is introduced, continuously or discontinuously, into the first compartment 304a while the agitators 312a-g are rotating and the molecular oxygen-containing gas 120 is introduced into each of the compartments 304a-f. A selected portion of the feed stream 320 flows serially from compartment-to-compartment through the underflow opening(s) in each of the intervening dividers 308a-d. In the fifth compartment 304e, the selected feed stream portion overflows the fifth divider 308e and enters the sixth and last autoclave compartment 304f. The fully reacted (e.g., reduced or oxidized) feed stream portion is removed as product 324 from the sixth compartment. As noted, the product 324 is typically subjected to further processing, such as to recover dissolved metals from the product.

In a typical sulfide oxidizing autoclave, the internal autoclave gas pressure is superatmospheric and more typically ranges from about 50 to about 100 p.sia. The molecular oxygen partial pressure in the autoclave is maintained typically from about 50 to about 300 psig. The typical operating temperature of the autoclave ranges from about 150 to about 300 degrees Celsius.

EXPERIMENTAL

Comparative measurements of the RTD of the liquids and solids and the mass transfer of oxygen were made with typical overflow weirs and especially designed underflow openings in the separating walls or dividers between the individual compartments.

The test autoclave was cylindrically shaped. It had an outer diameter of 480 mm and five compartments. The first compartment had two agitators, and the remaining downstream compartments had one agitator. The first compartment was about twice the volume of each of the (equally sized) downstream compartments.

Three divider designs were employed in the various experiments. One set of dividers had the overflow weir design of FIG. 2, with a 200-mm wide notch 200. The height of the notch above the bottom of the autoclave was 380 mm. A second set of dividers had the design of FIG. 5, with a single 39-mm diameter underflow opening. The third set of dividers had the design of FIG. 6, with three underflow openings. The underflow openings of FIG. 6 each had a diameter of 22 mm and were radially offset from one another by 30 degrees.

The absorbed power and the power number for the test autoclave were determined via torque and speed measurement. Under ungassed conditions, the power number had a constant value of 7.3.

The mixing time characteristic measurements were made through visual observation of the decolorization of a deep blue iodine starch complex by addition of a stoichiometric quantity of thiosulfate. In the first chamber the two mixers induce two distinct circulation loops, which lead to a relatively high mixing time characteristic. Little influence on the mixing time in the first compartment was found with counteracting mixers or when the relative distance of the two mixers was decreased. The two distinct circulation loops are certainly beneficial for the RTD. A residence time corresponding to more than a single cell can be expected. The dimensionless mixing time results are shown in Table 1 below.

TABLE 1

Dimensionless mixing time.

| compartment | rotational direction agitator 1/1-1/2 | distance between agitators (comp. 1) [mm] | dimensionless mixing time n Θ [—] |
|---|---|---|---|
| 1 | cw-cw | 480 | 53.3 |
| 1 | cw-ccw | 480 | 65.7 |
| 1 | cw-ccw | 320 | 53.3 |
| 2-5 | — | — | 24.5 |

The surface movement (wave number) was determined for the overflow weirs. A pronounced surface movement was observed, which leads to a wash of the liquid over the weirs, causing short circuiting from chamber to chamber and a reduced liquid volume (mainly in the first chamber with the highest power input). A dimensionless wave number for each test was determined by known techniques.

A wave number was defined as follows $$c_w = \frac{2 \cdot g \cdot h_w}{n^2 \cdot d_2^2}$$

wherein g is the gravity constant, $h_W$ is the wave height, n is the mixer speed, and $d_2$ is the impeller diameter.

The results of the tests are given in Table 2.

TABLE 2

Dimensionless wave number in compartment 1 and 2.

| compartment | rotational direction agitator 1/1-1/2 | distance between agitators (comp. 1) [mm] | dimensionless wave number [—] |
|---|---|---|---|
| 1 | cw-cw | 480 | 0.65 |
| 1 | cw-cw | 320 | 0.58 |
| 2-5 | — | — | 0.45 |

As can be seen in Table 2, the resulting wave heights are much higher than the level difference from chamber to chamber due to the pressure drop in the overflow weirs.

Measurement of the drag coefficient for the different over- and underflow configurations was performed. To calculate the level difference in the overflow weir the use of the Rehbock correlation was used.

$$h_{ov} = \left(\frac{q}{0{,}4 \cdot l_{ov} \cdot \sqrt{2 \cdot g}}\right)^{2/3} \text{ m}$$

where $h_{OV}$ is the height of the liquid level for the overflow weir, q is the feed rate to the autoclave, $l_{OV}$ is the length of the overflow weir.

The level difference can be calculated as follows:

$$h_{un} = 3.6 \cdot \frac{1}{2 \cdot g} \cdot \left(\frac{q \cdot 4}{z \cdot d_{und}^2 \cdot \pi}\right)^2 \text{ m}$$

In the above equation, the 3.6 represents the drag coefficient for the underflow openings of FIGS. 5 and 6. In the equation, $h_{un}$ is the height of the liquid level for the underflow divider and $d_{und}$ is the diameter of the underflow opening.

The RTD was measured for the various divider configurations using water without solids content. Conductivity probes were positioned in all chambers of the test autoclave. Two procedures were applied to get a pulse response signal and a step response signal, where n is the number of compartments, τ the total residence time in the autoclave. and t/τ the normalized time. The volume of each compartment is assumed to be identical.

The pulse response function for n compartments is given by (n>1)

$$\frac{c}{c_0} = \frac{n^n}{(n-1)!} \cdot \left(\frac{t}{\tau}\right)^{n-1} \cdot e^{-n \cdot \frac{t}{\tau}}$$

where c is the concentration.

The step response function for n compartments is given by (n>1)

$$\frac{c}{c_0} = 1 - e^{-n \cdot \frac{t}{\tau}}\left[1 + n \cdot \frac{t}{\tau} + \frac{1}{2!} \cdot \left(\frac{n \cdot t}{\tau}\right)^2 + \ldots + \frac{1}{(n-1)!} \cdot \left(\frac{n \cdot t}{\tau}\right)^{n-1}\right]$$

To get a pulse response, a salt solution was added instantaneously into the pure water fed to the first autoclave chamber. The decay of the concentration was normalized with the initial maximum concentration and recorded for all chambers as a function of the normalized residence time.

To get a step response, a salt solution was added continuously to the first autoclave chamber. The increase of the concentration was normalized with the final maximum concentration and recorded for all chambers as a function of the normalized time. Only the results for the last chamber number five are compared in the figures.

alternating off-center orientation of the underflow openings, as shown in FIGS. 8A and 8B, was tested and did not appear to provide a further advantage.

Constant specific power input tests were performed. The different test conditions and results are given in Table 3 below.

TABLE 3

| Test no. | maximum @ t/τ | | | | | flow | holes no. | diameter mm | position | shaft speed comp. 1/1-1/2-2-3-4-5 | rotation comp. 1/1-1/2-2-3-4-5 |
|---|---|---|---|---|---|---|---|---|---|---|---|
| | comp. 1 | comp. 2 | comp. 3 | comp. 4 | comp. 5 | | | | | | |
| CSTR pulse | 0.000 | 0.496 | 0.661 | 0.743 | 0.785 | | | | | | |
| C 3 | 0.023 | 0.175 | 0.337 | 0.499 | 0.673 | over | — | — | — | 200-200-200-200-200-200 | cw-ccw-cw-cw-cw-cw |
| C 4 | 0.024 | 0.112 | 0.282 | 0.439 | 0.628 | over | — | — | — | 305-305-250-200-200-200 | cw-cw-cw-cw-cw-cw |
| C 5 | 0.024 | 0.146 | 0.325 | 0.478 | 0.673 | over | — | — | — | 200-200-200-200-200-200 | cw-cw-cw-cw-cw-cw |
| C 6 | 0.015 | 0.122 | 0.285 | 0.447 | 0.630 | over | — | — | — | 305-305-250-200-200-200 | cw-cw-cw-cw-cw-cw |
| C 7 | 0.008 | 0.150 | 0.298 | 0.507 | 0.636 | under | 3 | 22 | center | 305-305-250-200-200-200 | cw-cw-cw-cw-cw-cw |
| C 8 | 0.007 | 0.172 | 0.349 | 0.539 | 0.673 | under | 3 | 22 | center | 305-305-250-200-200-200 | cw-cw-cw-cw-cw-cw |
| C 9 | 0.014 | 0.178 | 0.367 | 0.562 | 0.719 | under | 3 | 22 | center | 305-305-250-200-200-200 | cw-cw-ccw-cw-ccw-cw |
| C 10 | 0.017 | 0.188 | 0.369 | 0.562 | 0.711 | under | 3 | 22 | −30°/ +30°/ −30°/ +30° | 305-305-250-200-200-200 | cw-cw-ccw-cw-ccw-cw |
| C 11 | 0.016 | 0.176 | 0.357 | 0.547 | 0.698 | under | 3 | 22 | center | 370-370-334-260-260-260 | cw-cw-ccw-cw-ccw-cw |
| C 12 | 0.012 | 0.106 | 0.230 | 0.390 | 0.559 | over | — | — | — | 370-370-334-260-260-260 | cw-cw-cw-cw-cw-cw |
| C 13 | 0.009 | 0.068 | 0.170 | 0.318 | 0.431 | under | 3 | 35 | center | 370-370-334-260-260-260 | cw-cw-ccw-cw-ccw-cw |
| C 14 | 0.032 | 0.118 | 0.263 | 0.441 | 0.578 | under | 3 | 35 | center | 370-370-334-260-260-260 | cw-cw-ccw-cw-ccw-cw |
| C 15 | 0.015 | 0.096 | 0.240 | 0.420 | 0.556 | under | 3 | 35 | center | 370-370-334-260-260-260 | cw-cw-ccw-cw-ccw-cw |
| C 16 | 0.020 | 0.099 | 0.264 | 0.453 | 0.677 | under | 3 | 35-22-22-22 | center | 370-370-334-260-260-260 | cw-cw-ccw-cw-ccw-cw |
| C 17 | 0.012 | 0.094 | 0.264 | 0.448 | 0.645 | under | 3 | 35-22-22-22 | center | 370-370-334-260-260-260 | cw-cw-ccw-cw-ccw-cw |
| C 18 | 0.015 | 0.149 | 0.314 | 0.498 | 0.683 | under | 1 | 39 | center | 370-370-334-260-260-260 | cw-cw-ccw-cw-ccw-cw |
| C 19 | 1.700 | 1.790 | 1.850 | 1.970 | 2.260 | under | 1 | 39 | center | 370-370-334-260-260-260 | cw-cw-ccw-cw-ccw-cw |
| C 20 | 1.650 | 1.750 | 1.750 | 1.910 | 2.150 | over | 1 | — | — | 370-370-334-260-260-260 | cw-cw-ccw-cw-ccw-cw |
| C 21 | 0.012 | 0.134 | 0.299 | 0.474 | 0.640 | over | — | — | — | 253-253-205-205-205-205 | cw-cw-ccw-cw-ccw-cw |
| C 22 | 0.014 | 0.156 | 0.338 | 0.492 | 0.719 | over | — | — | — | 253-253-205-205-205-205 | cw-cw-ccw-cw-ccw-cw |
| C 23 | 0.942 | 1.050 | 1.360 | 1.450 | 1.860 | over | — | — | — | 253-253-205-205-205-205 | cw-cw-ccw-cw-ccw-cw |
| C 24 | 1.270 | 1.270 | 1.590 | 1.680 | 2.220 | over | — | — | — | 253-253-205-205-205-205 | cw-cw-ccw-cw-ccw-cw |
| C 25 | 0.011 | 0.116 | 0.268 | 0.434 | 0.620 | under | 1 | 39 | center | 253-253-205-205-205-205 | cw-cw-ccw-cw-ccw-cw |
| C 26 | 0.780 | 0.950 | 1.270 | 1.450 | 1.950 | under | 1 | 39 | center | 253-253-205-205-205-205 | cw-cw-ccw-cw-ccw-cw |
| C 27 | 0.017 | 0.173 | 0.339 | 0.514 | 0.705 | under | 1 | 39 | center | 253-253-205-205-205-205 | cw-cw-ccw-cw-ccw-cw |
| C 28 | 0.900 | 1.120 | 1.360 | 1.570 | 2.050 | under | 1 | 39 | center | 253-253-205-205-205-205 | cw-cw-ccw-cw-ccw-cw |
| C 29 | 0.012 | 0.152 | 0.316 | 0.506 | 0.690 | under | 3 | 22 | center | 253-253-205-205-205-205 | cw-cw-ccw-cw-ccw-cw |
| C 30 | 1.074 | 1.237 | 1.620 | 1.789 | 2.270 | under | 3 | 22 | center | 253-253-205-205-205-205 | cw-cw-ccw-cw-ccw-cw |

First tests were run at a scale-down criterion of constant specific power input. Due to splashing in the model scale the power input was decreased (3.3 kW/m$^3$ in the first chamber). To suppress additional short circuiting of liquid being washed over the side of the dividers additional tests were run at a scale-down criterion achieving the same wave number which results in a lower specific power input of 1.0 kW/m$^3$. After some preliminary tests the different underflow divider designs and the overflow weir were compared at the same conditions.

One of the preliminary tests was to investigate the influence of the rotational direction of the agitators. As a precursor, some visual observation using colored water was done. The best results were achieved with the underflow dividers when the impellers were counter-rotating from chamber to chamber. To quantify the observations, in one test the rotational directions of the agitators in chambers two and four were changed. The comparison with another test using the standard identical rotational direction of the agitators shows the better performance of the altered rotational direction. The maximum of the pulse response was shifted from 0.673 to 0.719 and the volume efficiency improved from 87.7% to 93.8%. An In FIG. 9, the results of the overflow and four different underflow divider designs are compared for the pulse input response. In FIG. 10, the arrangements are compared for the step input response. The underflow geometry with one hole of 39 mm and three holes with 22 mm gave the best results. The curves are closest to the calculated theoretical CSTR pulse and step input response.

The bigger deviation from the theoretical values with the overflow weirs can be explained by the short circuit effect due to the wave formation and reduction in useful volume. For the underflow dividers, the wave situation at the liquid surface is of no importance because the underflow dividers are designed to avoid overflow.

Figure 12:
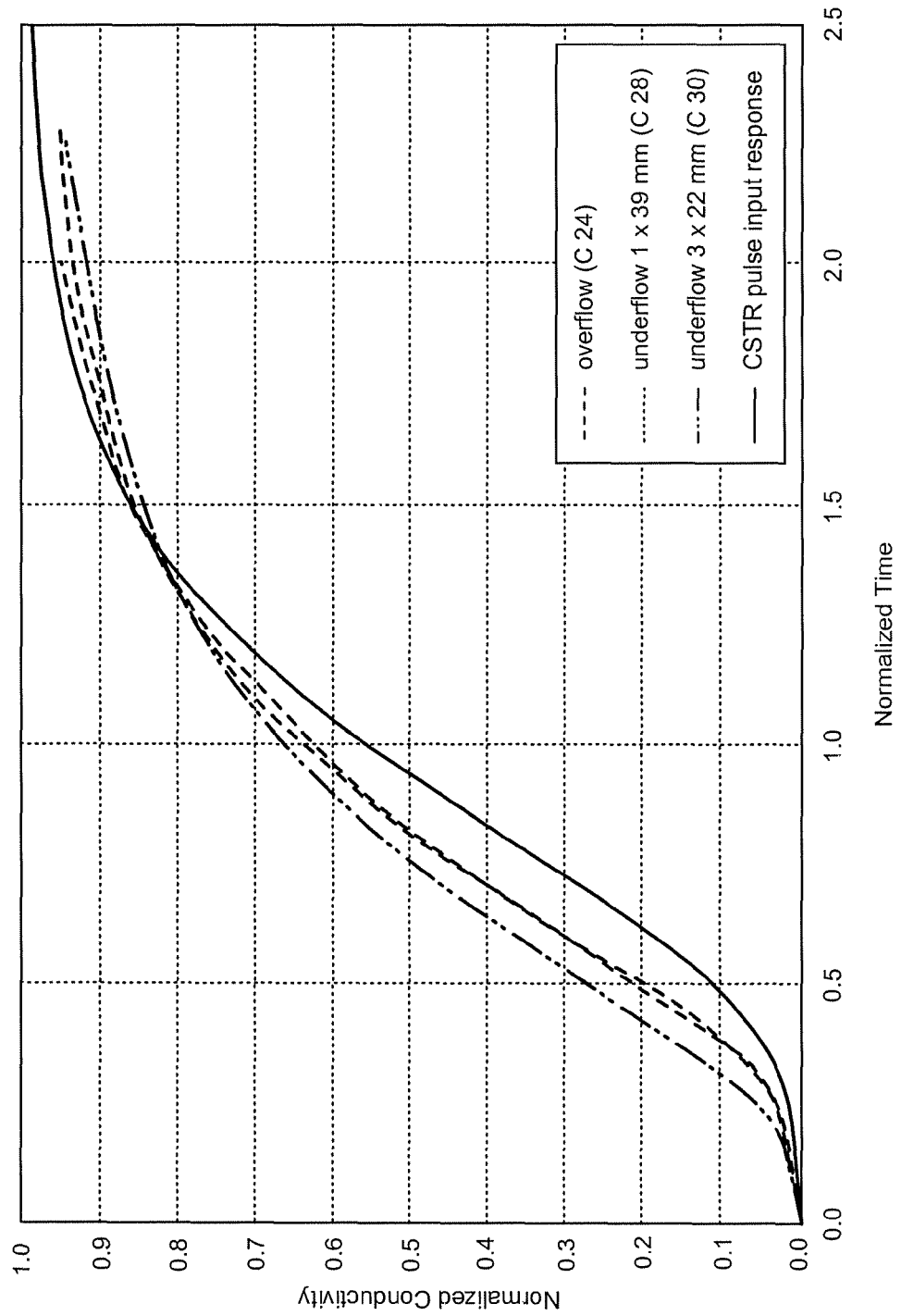
FIG. 12 is a plot of normalized conductivity (vertical axis) against normalized time (horizontal axis) to compare the step input response for the overflow and different underflow arrangements at the same conditions (wave number)

With reference to FIGS. 11-12, constant wave number tests were performed. Compared to the measurements at a constant specific power input, the curves for the overflow weir are closer to the underflow divider and the step input response. This proves that the wave formation or surface movement influences the RTD.

The pulse response still shows a poorer result compared with the underflow divider but the maximum of the curve changed from 0.56 to 0.64 (normalized time). For the two underflow divider designs, the maximum was at the same normalized time.

For the step input response, the data are even closer together. The underflow divider design with three holes of 22 mm shows a broader response function.

From the tests of the measurement of the RTD with the conductivity, it can be concluded that the change from the overflow to the underflow arrangement as described will give a better RTD in the autoclave.

The RTD was next determined for various divider configurations using a solid-containing liquid or slurry. After adjusting the feed of pure water, plastic beads with a diameter of 3 mm, a density of 1050 kg/m$^3$, with a concentration of ~1% were added into chamber 1. These plastic beads have a similar settling velocity compared to the processed minerals. To get a pulse input response, the beads were added instantaneously, and to get a step input response, the beads were added continuously. The normalized weight fraction for each test leaving chamber five was recorded as a function of the normalized residence time.

The different test conditions are given in Table 4 below.

TABLE 4

| test no. | overflow/ underflow | holes no. | diameter mm | position | rotation comp. 1/1-1/2-2-3-4-5 | shaft speed comp. 1/1-1/2-2-3-4-5 |
|---|---|---|---|---|---|---|
| G 1 | over | — | — | — | cw-cw-cw-cw-cw-cw | 200-200-200-200-200-200 |
| G 2 | over | — | — | — | cw-cw-cw-cw-cw-cw | 220-220-220-220-220-220 |
| G 3 | underflow | 3 | 22 | center | cw-cw-ccw-cw-ccw-cw | 305-305-250-200-200-200 |
| G 4 | underflow | 3 | 22 | center | cw-cw-ccw-cw-ccw-cw | 370-370-334-260-260-260 |
| G 5 | over | — | — | — | cw-cw-cw-cw-cw-cw | 370-370-334-260-260-260 |
| G 6 | over | — | — | — | cw-cw-cw-cw-cw-cw | 370-370-334-260-260-260 |
| G 7 | over | — | — | — | cw-cw-cw-cw-cw-cw | 370-370-334-260-260-260 |
| G 8 | underflow | 3 | 35 | center | cw-cw-ccw-cw-ccw-cw | 370-370-334-260-260-260 |
| G 9 | underflow | 3 | 35-22-22-22 | center | cw-cw-ccw-cw-ccw-cw | 370-370-334-260-260-260 |
| G 10 | underflow | 3 | 35-22-22-22 | center | cw-cw-ccw-cw-ccw-cw | 370-370-334-260-260-260 |
| G 11 | underflow | 1 | 39 | center | cw-cw-ccw-cw-ccw-cw | 370-370-334-260-260-260 |
| G 12 | over | — | — | — | cw-cw-ccw-cw-ccw-cw | 253-253-205-205-205-205 |
| G 13 | over | — | — | — | cw-cw-ccw-cw-ccw-cw | 253-253-205-205-205-205 |
| G 14 | underflow | 1 | 39 | center | cw-cw-ccw-cw-ccw-cw | 253-253-205-205-205-205 |
| G 15 | underflow | 1 | 39 | center | cw-cw-ccw-cw-ccw-cw | 253-253-205-205-205-206 |

The test results will be discussed with reference to FIGS. 13-15.

Figure 13:
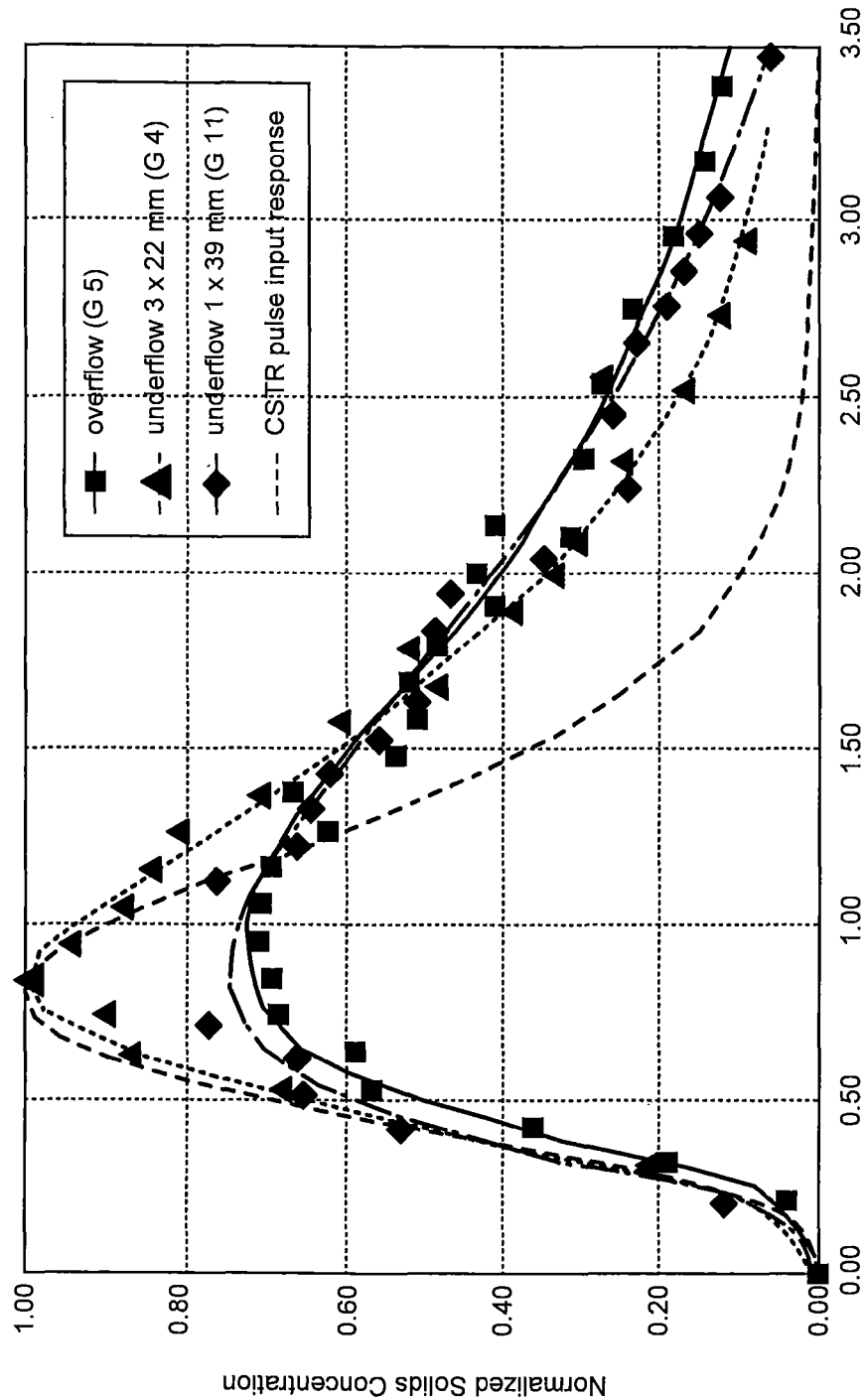
FIG. 13 is a plot of normalized conductivity (vertical axis) against normalized time (horizontal axis) to compare the pulse input response for the overflow and different underflow arrangements at the same conditions (specific power input)

In FIG. 13, the RTD of the two underflow divider designs and the overflow weir are given at the same specific power input as in the production scale. The distribution for the underflow divider design with three holes with a diameter of 22 mm is narrower, with the maximum of the RTD being slightly closer to the theoretical CSTR.

FIGS. 14-15 show the test results for tests performed for Constant wave numbers (tests G 12-G 15). In FIG. 14, the RTD of one underflow divider design and the overflow weir are given at the same wave member as in the production scale. At these conditions, the results are completely different as for the other scale-down conditions. The RTD for the underflow arrangement is narrower than at the higher power input, with the maximum being much closer to the theoretical CSTR. For the overflow weir, the RTD gets even wider as before, with the absolute value of the solids concentration being decreased. This result might indicate a poor level of homogeneity of the suspended particles. This result does show one advantage of the underflow divider designs. The accumulation of bigger particles in the autoclave is less probable. As shown in FIG. 15, the same conclusion can be drawn. Here the step input response is shown. For the overflow weir, the solids concentration at the outlet is much lower than at the inlet, meaning an accumulation of solids occurs.

To properly assess the effectiveness of the underflow dividers, mass transfer measurements were undertaken. The gas/liquid mass transfer $k_l \cdot a$ can be influenced by the specific power input of the mixer, which will influence the bubble size. The gas supply will determine the member of bubbles. In large equipment such as fermenters with volumes up to 500 m$^3$ and flue gas desulfurisation sumps with volumes up to 5000 m$^3$, the specific power input and the gas supply were found to be the influencing parameters. The resulting correlations are of the type:

$$k_l \cdot a = b \cdot \left(\frac{P}{V}\right)^c \cdot v_{SG}^d$$

with b, c and d being system dependent. For pure gases the $V_{SG}$ term does not have a significance.

The tests were intended to make variations of P/V and the oxygen supply to get the trends of the influencing parameters. The trends enable the forecast of the performance of the production autoclave.

The $k_l \cdot a$-values were measured with mineral containing water (up to 0.4 mo/l) in the presence of 3 ppm Co$^{2+}$ as a catalyst using molecular oxygen as a gas under ambient conditions. The mass transfer measurements were therefore made under purely non-coalescing conditions due to the presence of ions of a small atomic radius. These conditions provide small bubbles and mass transfer coefficients up to a factor five higher than under coalescent conditions. At temperatures >150° C. the mineral concentration does not effect the coalescence behavior anymore, the liquid gets a coalescent behavior. This deficit is partly compensated by a factor of approximately five higher diffusion coefficient of oxygen in water at 230° C.

For bubbles >2.5 mm $$Sh = 0.42 \cdot Sc^{1/2} \cdot Ar^{1/3}$$

The $k_l$-values in the O$_2$/water system of 230° C. and the O$_2$/water system under ambient conditions are therefore increased by a factor of 2.3. If the produced ions (for instance Fe$^{2+}$) induce a chemical enhancement a further positive influence can happen.

The test were performed as follows:

(a) preparation of a 0.4 molar sodium sulfate solution containing 3 ppm of Co$^{2+}$ in the model autoclave;

(b) start of pump;

(c) addition of a defined quantity solid Sodium sulfite per unit of time, corresponding to the aimed mass transfer coefficient;

(d) continuous measurement of the dissolved molecular oxygen concentration in the individual chambers; and (e) maintaining the conditions over a period >1 of the normalized residence time.

In FIG. 16, a typical test result is given. The $k_1 \cdot a$-values in the first compartment for the underflow arrangement are about 20% higher than for the overflow arrangement. This is probably, again, the effect of the wave formation at the test conditions. The mass transfer performance of the autoclave at process conditions is sufficient for any design of the separation walls.

The above test results with the underflow openings show an advantage in volume efficiency, an improved RTD, and higher mass transfer coefficients. The negative effects with the overflow weirs are mainly due to a pronounced surface movement induced by the mixers leading to a wash over effect on the overflow weirs. As a result of this wash over effect, short circuiting and a reduction in useful volume occurs. With an adequate design of the separating walls with the underflow openings, this detrimental wash over effect can be avoided.

A number of variations and modifications of the invention can be used. It would be possible to provide for some features of the invention without providing others.

For example in one alternative embodiment, the autoclave compartments are oriented vertically as opposed to horizontally.

In another alternative embodiment, the present invention can be used in multi-compartment stirred tank reactors other than autoclaves. Such reactors may or may not operate at elevated pressures.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing a feed stream, comprising:
   (a) introducing the feed stream into a stirred tank reactor, the feed stream being a slurry of solid metal-containing particles, the stirred tank reactor comprising a plurality of compartments, a plurality of agitators positioned in the plurality of compartments, and a plurality of dividers separating the plurality of compartments, each of the dividers including at least one underflow opening;
   (b) introducing a molecular oxygen-containing gas into the stirred tank reactor; and
   (c) passing at least most of the feed stream between sets of adjacent compartments through the at least one underflow opening in the respective divider separating the adjacent compartments, wherein a cumulative cross-sectional area of the at least one underflow opening in each of the dividers is different from a cumulative cross-sectional area of the at least one underflow opening in each of the other dividers to maintain a difference in liquid levels between sets of adjacent compartments in the range of from about 5 to about 150 mm.

2. The method of claim 1, wherein each of a number of the dividers are higher than a feed stream level in an adjacent, upstream compartment so that the feed stream does not overflow the corresponding divider, wherein the cumulative cross-sectional area of the at least one underflow opening ranges from about 0.06 m² to about 1.50 m², wherein a flow volume between adjacent compartments ranges from about 200 m³/hour to about 800 m³/hour, and wherein a height-to-diameter ratio of each of the dividers is at least about 0.80.

3. The method of claim 1, wherein, in each of the dividers, the cumulative cross-sectional area of the at least one underflow opening ranges from about 0.06 to about 1.50 m² and wherein a flow volume between adjacent compartments ranges from about 200 to about 800 m³/hour.

4. The method of claim 3, wherein cumulative cross-sectional area of at least one underflow opening in a first divider at an input end of the reactor is less than a cumulative cross-sectional area of the at least one underflow opening in a second divider, the second divider being nearer an output end of the reactor than the first divider.

5. The method of claim 1, wherein, in each of the plurality of dividers, the at least one underflow opening is positioned at or below an uppermost impeller blade of the agitator in an adjacent, upstream compartment and wherein a head drop between adjacent compartments is maintained in a range from about 5 to about 50 mm.

6. The method of claim 1, wherein, in each of the plurality of dividers, the at least one underflow opening is positioned above a bottom of the stirred tank reactor at a height that is no more than about 66% of the liquid level in an adjacent, upstream compartment and wherein, in a selected divider, a ratio of cumulative cross sectional area of the at least one opening to feed stream flowrate through the at least one opening ranges from about 1 to about 7.

7. The method of claim 1, wherein agitators in a plurality of sets of adjacent compartments counter-rotate and wherein a liquid level in a first compartment ranges between about 5 to about 50 mm higher than a liquid level in an adjacent second compartment.

8. The method of claim 7, wherein, in the first compartment, a first agitator rotates clockwise and the at least one underflow opening in a first divider, separating the first compartment from the adjacent second compartment, is positioned to the right of a longitudinal center line of the stirred tank reactor and wherein, in the second compartment, a second agitator rotates counterclockwise and the at least one underflow opening in a second divider separating the second compartment from an adjacent third compartment, is positioned to the left of the longitudinal center line of the stirred tank reactor.

9. The method of claim 1, wherein a final downstream divider in the stirred tank reactor is free of at least one underflow opening and is configured as an overflow divider.

10. The method of claim 1, wherein at least one underflow opening in a first divider separating a first compartment from an adjacent second compartment is positioned to the right of a longitudinal axis and the at least one underflow opening in a second divider separating the second compartment from an adjacent third compartment is positioned to the left of the longitudinal axis of the stirred tank reactor.

11. A method for processing a metal sulfide-containing material, comprising:
   (a) introducing into a stirred tank reactor an input slurry comprising a comminuted metal sulfide-containing material, the stirred tank reactor comprising a plurality of compartments for receiving the input slurry, a plurality of agitators positioned in the plurality of compartments for mixing the input slurry, and a plurality of dividers separating the plurality of compartments, each of the dividers including at least one underflow opening for passing the input slurry from compartment to compartment;
   (b) introducing a molecular oxygen-containing gas into the stirred tank reactor;
   (c) oxidizing the metal sulfide-containing material in the input slurry to provide a product slurry comprising the oxidized metal-containing material, wherein the oxidizing step comprises the substep of passing at least most of the slurried material between sets of adjacent compartments through the at least one underflow opening in the divider separating the adjacent compartments; and
   (d) thereafter recovering the metal from the product slurry, wherein:
   the plurality of dividers includes first and second dividers;
   the plurality of compartments comprises first, second, and third compartments;
   the first divider separates the first and second compartments;
   the second divider separates the second and third compartments;
   the third compartment is nearer an output end of the stirred tank reactor than the first and second compartments;
   the second compartment is positioned between the first and third compartments; and
   a first cumulative cross-sectional area of the at least one underflow opening in the first divider is less than a second cumulative cross-sectional area of the at least one underflow opening in the second divider, whereby head drops between the first and second compartments and between the second and third compartments are maintained in a range from about 5 to about 50 mm.

12. The method of claim 11, wherein the metal is at least one of a base metal, a platinum group metal, and a precious metal, wherein each of the dividers are higher than a feed stream level in an adjacent, upstream compartment, wherein the cumulative cross-sectional area of the at least one underflow opening ranges from about 0.06 $m^2$ to about 1.50 $m^2$, wherein a flow volume between adjacent compartments ranges from about 200 $m^3$/hour to about 800 $m^3$/hour, and wherein a height-to-diameter ratio of each of the dividers is at least about 0.80.

13. The method of claim 11, wherein, in each of the dividers, the cumulative cross-sectional area of the at least one underflow opening ranges from about 0.06 to about 1.50 $m^2$, wherein a flow volume between adjacent compartments ranges from about 200 to about 800 $m^3$/hour, and wherein, in each of the plurality of dividers, a ratio of the cumulative cross-sectional area of the respective at least one underflow opening in each of the dividers to slurry flowrate through the respective at least one underflow opening ranges from about 1.0 to about 7.0.

14. The method of claim 11, wherein, in each of the plurality of dividers, the at least one underflow opening is positioned above a bottom of the stirred tank reactor at a height that is no more than about 66% of the liquid level in the adjacent, upstream compartment and wherein the cumulative cross-sectional areas between the respective at least one underflow opening in the first and second dividers are within about 25% of one another.

15. The method of claim 11, wherein, in the first compartment, a first agitator rotates clockwise and the at least one underflow opening in the first divider, separating the first compartment from the adjacent second compartment, is positioned to the right of a longitudinal axis of the stirred tank reactor and wherein, in the second compartment, a second agitator rotates counterclockwise and the at least one underflow opening in the second divider, separating the second compartment from the adjacent third compartment, is positioned to the left of the longitudinal axis of the stirred tank reactor.

16. The stirred tank reactor of claim 11, wherein a final downstream divider in the stirred tank reactor is free of at least one underflow opening and is configured as an overflow divider.

17. A method, comprising:
   providing an autoclave comprising:
      (a) a plurality of compartments comprising adjacent at least first and second compartments;
      (b) a plurality of agitators for mixing a feed stream, the agitators being positioned in the plurality of compartments, the feed stream comprising a comminuted metal sulfide-containing material; and
      (c) a plurality of dividers separating the plurality of compartments, each of the dividers including at least one underflow opening for passing the feed stream from compartment to compartment;
   inputting the feed stream into the first compartment, the feed steam flowing sequentially from compartment to compartment;
   introducing a molecular oxygen-containing gas into the autoclave;
   oxidizing the metal sulfide-containing material in the feed stream to provide a product slurry comprising the oxidized metal-containing material, wherein the oxidizing step comprises the substep of passing at least most of the feed stream between sets of adjacent compartments through the at least one underflow opening in the divider separating the adjacent compartments; and
   thereafter recovering the metal from the product slurry, wherein:
   at least about 75% of the feed stream passes between adjacent pairs of the plurality of compartments by passing through the at least one underflow opening in a respective divider separating the adjacent pairs of compartments;
   a first divider separates the first and second compartments;
   a second divider separates the second compartment and a third compartment;
   the third compartment is nearer an output end of the autoclave than the first and second compartments;

the second compartment is positioned between the first and third compartments; and a first cumulative cross-sectional area of the at least one underflow opening in the first divider is less than a second cumulative cross-sectional area of the at least one underflow opening in the second divider, whereby a first liquid level in the first compartment is higher than a second liquid level in the second compartment and the second liquid level is higher than a third liquid level in the third compartment.

18. The method of claim 17, wherein a final downstream divider in the autoclave is free of at least one underflow opening and is configured as an overflow divider.

19. The method of claim 17, wherein at least one underflow opening in the first divider separating the first compartment from the adjacent second compartment is positioned to the right of a longitudinal axis and the at least one underflow opening in the second divider separating the second compartment from the adjacent third compartment is positioned to the left of the longitudinal axis of the autoclave.

20. The method of claim 17, wherein each of the plurality of the dividers is higher than a feed stream level in a respective adjacent, upstream compartment so that the feed stream does not overflow the corresponding divider and wherein a height-to-diameter ratio of each of the dividers is at least about 0.80.

21. The method of claim 17, wherein, in each of the plurality of dividers, the cumulative cross-sectional area of the at least one underflow opening ranges from about 0.06 m$^2$ to about 1.50 m$^2$ and wherein a flow volume between adjacent compartments ranges from about 200 m$^3$/hour to about 800 m$^3$/hour.

22. The method of claim 21, wherein the cumulative cross-sectional area of the at least one underflow opening in each of the plurality of dividers is different, with the cumulative cross-sectional area of the at least one underflow opening in the first divider at the input end of the autoclave being less than the cumulative cross-sectional area of the at least one underflow opening in the second divider, the second divider being nearer the output end of the autoclave than the first divider.

23. The method of claim 17, wherein, in each of the plurality of dividers, the at least one underflow opening is positioned at or below an uppermost impeller blade of the agitator in the adjacent, upstream compartment and wherein a head drop between adjacent pairs of compartments is maintained in a range from about 25 to about 100 mm.

24. The method of claim 17, wherein, in each of the plurality of dividers, the at least one underflow opening is positioned above a bottom of the autoclave at a height that is no more than about 33% of the liquid level in the adjacent, upstream compartment and wherein, in a selected divider, a ratio of cumulative cross sectional area of the at least one opening to feed stream flowrate through the at least one opening ranges from about 1 to about 7.

25. The method of claim 17, wherein agitators in a plurality of sets of adjacent compartments counter-rotate and wherein a liquid level in the first compartment ranges between about 5 to about 150 mm higher than a liquid level in the adjacent second compartment.

26. The method of claim 17, wherein, in the first compartment, a first agitator rotates clockwise and the at least one underflow opening in the first divider, separating the first compartment from the adjacent second compartment, is positioned to the right of a longitudinal axis of the autoclave and wherein, in the second compartment, a second agitator rotates counterclockwise and the at least one underflow opening in the second divider, separating the second compartment from the adjacent third compartment, is positioned to the left of the longitudinal axis of the autoclave.

* * * * *